United States Patent [19]

Watanabe

[11] Patent Number: 5,739,513
[45] Date of Patent: *Apr. 14, 1998

[54] AUTOMATED SHOPPING BASKET SYSTEM WITH ACCOUNTING USING MARKS WRITTEN ON ARTICLES

[75] Inventor: Nobuyuki Watanabe, Kamakura, Japan

[73] Assignee: Mitsubishi Denki Kabushiki Kaisha, Tokyo, Japan

[*] Notice: The term of this patent shall not extend beyond the expiration date of Pat. No. 5,637,847.

[21] Appl. No.: 790,323

[22] Filed: Jan. 28, 1997

Related U.S. Application Data

[63] Continuation of Ser. No. 400,853, Mar. 8, 1995, Pat. No. 5,637,847.

[30] Foreign Application Priority Data

Mar. 10, 1994 [JP] Japan ................... 6-039486

[51] Int. Cl.$^6$ ............................. G06K 15/00
[52] U.S. Cl. ............. 235/383; 235/385; 186/61
[58] Field of Search ...................... 235/462, 383, 235/472, 494, 385, 375; 186/61

[56] References Cited

U.S. PATENT DOCUMENTS

| | | | |
|---|---|---|---|
| 3,836,755 | 9/1974 | Ehrat | 235/383 |
| 4,071,740 | 1/1978 | Gogulski | 235/383 X |
| 4,929,819 | 5/1990 | Collins, Jr. | 235/383 |
| 4,929,928 | 5/1990 | Hultaker | 235/493 X |
| 5,128,520 | 7/1992 | Rando et al. | 235/383 X |
| 5,149,947 | 9/1992 | Collins, Jr. | 235/383 X |
| 5,170,045 | 12/1992 | Bengtsson | 235/462 |
| 5,208,445 | 5/1993 | Nahar et al. | 235/383 X |
| 5,250,789 | 10/1993 | Johnsen | 235/383 |
| 5,412,193 | 5/1995 | Swartz et al. | 235/383 |
| 5,457,307 | 10/1995 | Dumont | 235/383 |
| 5,540,301 | 7/1996 | Dumont | 235/383 X |
| 5,584,362 | 12/1996 | Dumont | 235/383 X |

FOREIGN PATENT DOCUMENTS

| | | |
|---|---|---|
| 2679677 | 1/1993 | France . |
| 2139889 | 2/1973 | Germany . |
| 3940605 | 6/1991 | Germany . |
| 58-96367 | 6/1983 | Japan . |
| 63-149791 | 6/1988 | Japan . |
| 63-223998 | 9/1988 | Japan . |
| 2-238594 | 9/1990 | Japan . |
| 3-73093 | 3/1991 | Japan . |
| 3-73094 | 8/1991 | Japan . |
| 5-108954 | 4/1993 | Japan . |
| 5314367 | 11/1993 | Japan . |
| 6-231364 | 8/1994 | Japan . |

*Primary Examiner*—Donald T. Hajec
*Assistant Examiner*—Michael G. Lee
*Attorney, Agent, or Firm*—Wolf, Greenfield & Sacks, P.C.

[57] ABSTRACT

A system for operating shopping basket with an accounting function. Each shopping basket comprises an article registering unit, an accounting control unit (calculator), a display, an alarm, a transmitter, a receiver, and an external memory. A "valid" mark is placed upon articles to be placed in the shopping basket. The article registering unit includes elements for detecting a moving direction of an article to and from the shopping basket, and elements for reading the status of the "valid" mark on the article. If an article is not properly registered, the "valid" mark is changed to an "invalid" mark. The calculator checks a valid/invalid status of articles, registers articles, and performs an accounting operation. The display indicates prices of articles received in the shopping basket, and a sub-total of the articles present therein. The alarm alerts a shopper of an article with an "invalid" mark and that a sub-total of articles actually present in the shopping basket does not agree with a sub-total calculated on the basis of identification codes of the articles.

11 Claims, 20 Drawing Sheets

VALID STATE

INVALID STATE

VALID STATE

INVALID STATE

AUTOMATED SHOPPING BASKET SYSTEM WITH ACCOUNTING USING MARKS WRITTEN ON ARTICLES

This application is a continuation of application Ser. No. 08/400,853, filed Mar. 8, 1995 now U.S. Pat. No. 5,637,847, entitled AUTOMATED SHOPPING BASKET SYSTEM WITH ACCOUNTING AND ARTICLE TRACKING FUNCTIONS now entitled: AUTOMATED SHOPPING BASKET SYSTEM WITH ACCOUNTING AND ARTICLE TRACKING FUNCTIONS.

BACKGROUND OF THE INVENTION

1. Field of the Invention

The present invention relates to a system for operating shopping baskets, each basket having an accounting function, and more particularly to a system which dispenses with cashiers' confirming articles which are put into such a shopping basket by a shopper.

2. Description of the Prior Art

Usually, a shopper puts articles into a shopping basket when it has an accounting function. The articles are scanned and registered by a bar code reader of an accounting section, and are then received in the shopping basket. A total amount of the articles is displayed by the accounting section. Thus, the shopper pays at a cashier's counter his or her bill displayed by the accounting section. In such a case, the cashier takes out the articles from the shopping basket and reads them using a scanner, thereby confirming the total amount of purchases (sales from the viewpoint of a shop owner) read by an identification code reader of the shopping basket. Such a system is disclosed in (A) Japanese Patent Laid-Open Publication No. Sho 63-149,791. (B) Japanese Patent Laid-Open Publications No. Hei 3-073,093 and No. Hei 3-073,094 disclose systems in which a weight of an article actually registered by the accounting section and put into such a shopping basket is compared with a weight calculated on the basis of an identification code assigned to the article, thereby checking the credibility of the amount displayed the shopping basket. Further, (C) Japanese Patent Laid-Open Publication No. Sho 63-223,998 exemplifies a system in which a color of a bar code label on each article is changed after the article is scanned, and the cashier visually checks all the color-changed labels on the articles. Still further, (D) Japanese Patent Laid-Open Publication No. Hei 2-238,594 discloses a system in which magnetic seals on articles are magnetized when they are scanned, and the cashier electrically checks whether the articles selected by the shopper carry the magnetized seals.

The foregoing shopping baskets with the accounting function are prone to the following problems. For instance, an inlet of the shopping basket usually remains open so that the shopper can put in or retrieve articles without their identification codes being read. Some articles may not be registered, due to the shopper's carelessness, or because of wilful action on the part of the shopper. Therefore, the amount displayed by the accounting section of the shopping basket does not always coincide precisely with the amount of the articles actually present in the shopping basket. To overcome this problem, it is necessary for the cashier to check the displayed amount with respect to the articles present in the shopping basket as disclosed in the foregoing publications. This means that in spite of a large investment to provide the shopping baskets with the accounting function, it is still necessary to have the cashiers check the amount as with ordinary shopping baskets without the accounting function, and cost and labor saving cannot be accomplished. With the publication (A), the shopper has to wait until his or her articles are checked by the cashier. In the case of the publication (B), the displayed amount may often be incorrect since there are a variety of articles whose weights are the same but which have different prices. With respect to the publication (C), since the scanned bar code labels change their original colors, not only it is difficult for the shopper to return his or her undesired articles but it also takes time for the cashier to visually check the selected articles, which means the shopper must wait at the cashier's counter. With the publication (D), the shopper has to wait at the counter because the cashier electrically checks the magnetized state of the labels of the selected articles.

It is therefore an object of the invention to provide a system for operating shopping baskets with the accounting function so as to overcome the foregoing problems of the prior art. Such a system does not necessitate the cashiers' confirming the amount displayed by the accounting section with the actual amount of the selected articles.

SUMMARY OF THE INVENTION

According to a first aspect of the invention, there is provided a shopping basket with an accounting function. The shopping basket comprises: a scanner for reading a code of an article received in the shopping basket; a calculator counting up each received article in accordance with a predetermined price list and deducting a price of each article retrieved from the shopping basket; a writer, checking whether or not the code of the article received in or retrieved from the shopping basket is correctly read, and assigning the article with an "invalid" mark when the code thereof is not read correctly; and an alarm alerting a shopper to retrieve from the shopping basket an article carrying the "invalid" mark while it is being put into the shopping basket, or alerting the shopper to return into the shopping basket an article which is given the "invalid" mark during its retrieval from the shopping basket.

The shopping basket further comprises an unsuccessfully-received-article counter which increases its count each time the "invalid" mark is given to an article when it is being put into the shopping basket, and decreases its count each time the article with the "invalid" mark is retrieved from the shopping basket.

Further, the shopping basket comprises an unsuccessfully-retrieved-article counter which increases its count each time an article is given the "invalid" mark during the retrieval thereof from the shopping basket, and decreases its count each time the article with the "invalid" mark is returned into the shopping basket.

The shopping basket further comprises a reader reading the "invalid" mark on an article. The calculator is not operated when the reader reads the "invalid" mark on the article put into or retrieved from the shopping basket, the writer rewrites the "invalid" mark to a "valid" mark, and the alarm is released when the article with the "invalid" mark is retrieved from or returned into the shopping basket.

There is a single opening in the shopping basket. The writer includes first writing means which rewrites the "invalid" mark to the "valid" mark each time an article with the "invalid" mark is returned into the shopping basket, and second writing means which rewrites the "invalid" mark to the "valid" mark each time an article with the "invalid" mark is retrieved from the shopping basket. The first and second writing means are disposed in the opening in such a manner that they sandwich the scanner and the reader therebetween.

The reader includes first reading means which reads the "invalid" mark each time an article with the "invalid" mark is returned into the shopping basket, and second reading means which reads the "invalid" mark each time an article with the "invalid" mark is retrieved from the shopping basket. The scanner includes first scanning means which reads the identification when an article is put into the shopping basket, and second scanning means which reads the identification code when an article is retrieved from the shopping basket. The first reading means and the first scanning means as a pair, and the second reading means and the second scanning means as a pair are arranged in the opening in such a manner that the respective pairs sandwich the writer therebetween.

The writer includes first writing means which rewrites the "invalid" mark to the "valid" mark each time an article with the "invalid" mark is returned into the shopping basket, and second writing means which rewrites the "invalid" mark to the "valid" mark each time an article with the "invalid" mark is retrieved from the shopping basket. The reader includes first reading means which reads the article code when an article is put into the shopping basket and second reading means which reads the article code when an article is retrieved from the shopping basket.

The shopping basket further comprises a display indicating a price of the last received article and a grand total of the articles present in the shopping basket.

The display indicates sale information of the articles present in the shopping basket.

The shopping basket further comprises warning means indicating when a total of articles successfully received in the shopping basket does not agree with a total indicated on the display, or when there is a problem preventing the shopper from continuing shopping.

The shopping basket further comprises a transmitter for transmitting accounting data of the articles present in the shopping basket to accounting means at a cashier's counter when the shopping basket arrives at the cashier's counter.

The transmitter further notifies a nearest showcase when there is a problem which prevents the shopper from continuing shopping.

The shopping basket further comprises a receiver receiving programs, information of articles and so on from a host computer as an external unit.

The receiver receives sale information from a showcase when the shopping basket approaches the showcase.

The shopping basket further comprises an external memory storing the received program and sale information.

The shopping basket further comprises an accounting system which is connected to the scanner, calculator, reader, writer, unsuccessfully-received-article counter, unsuccessfully-retrieved-article counter, alarm, warning means, receiver, transmitter and external memory, and which operates the shopping basket with the accounting function.

There is provided a system for operating shopping baskets with an accounting function. According to the system, each article is assigned a "valid" mark, and the "valid" mark is changed to an "invalid" mark when an identification code thereof is not correctly read.

Further, there is provided a system for operating shopping baskets with an accounting function. The system comprises a calculator including: an arrival sensor detecting the arrival of each shopping basket at a cashier's counter; a transmitter demanding the shopping basket to transmit accounting data; a receiver receiving the accounting data from the shopping basket; a display indicating data necessary for settling an account; a printer issuing a receipt; a departure sensor detecting the departure of the shopping basket from the cashier's counter; a host communication unit transmitting sale information of settled articles to an external host computer; and a control connected to the arrival sensor, transmitter, receiver, display, printer, departure sensor and host transmitter so as to control the operation of the foregoing units.

Still further, there is provided a system for operating shopping baskets with an accounting function. The system comprises an accounting unit including: an arrival sensor, detecting the arrival of each shopping basket at a cashier's counter; an entrance gate positioned at an entrance of the cashier's counter; a transmitter, demanding the shopping basket to send accounting data; a receiver receiving the accounting data from the shopping basket; a display indicating accounting data necessary to settle an account; a card reader allowing the account to be settled by a credit or banker's card; a printer issuing a receipt for a settled account; a departure sensor detecting the arrival of the shopping basket at an exit of the cashier's counter; an exit gate at the cashier's counter; and controls respectively connected to the arrival sensor, entrance gate, transmitter, receiver, display, card reader, printer, departure sensor, exit gate and host communication unit so as to control the operation of thereof.

There is further provided a system for operating shopping baskets with an accounting function. The system comprises showcases, each of the showcases including: an approach sensor detecting an approach of the shopping basket; a transmitter transmitting sale information of articles to the shopping basket; a receiver receiving an alarm from the shopping basket when the shopper comes across a problem which prevents a shopper from continuing shopping; a host communication unit notifying the problem to an external computer and/or receiving article sales information from the external host computer; and controls respectively connected to the approach sensor, transmitter, receiver and host communication unit so as to control the operation of the foregoing units.

According to the invention, a shopper can put articles carrying status codes into a shopping basket with the accounting function. The shopping basket includes an article registering mechanism having the article the status code reading/writing function. Therefore, the shopper can settle his or her account by simply moving the shopping basket to a cashier's counter. The cashier is not required to check the articles one by one. Such a shopping basket is operated according to an article checking/accounting algorithm. The present invention is also applicable when purchased articles are settled by credit or banker's cards. In such a case, it is possible to simplify transactions of a store and accomplish labor saving.

When the present invention is applied to a retail store, the shopper can confirm whether or not a price of a selected article is correctly calculated on the basis of an identification code thereon. When the shopping basket arrives at a cashier's counter with the articles in the valid state, the total of the articles present in the shopping basket always agree with the total calculated on the basis of the identification codes of the articles each time the article is put into the shopping basket. Thus, the shopper can pay the bill without the cashier's checking the account. Further, if the invention is applied to a retail store where credit or banker's cards are acceptable, it is possible to accomplish labor saving since the number of cashiers can be reduced. Still further, if the present invention is applied to a factory so as to sort or convey components, such a factory can be structured in extensively simplified manner.

DESCRIPTION OF THE PREFERRED EMBODIMENTS

Figure 1:
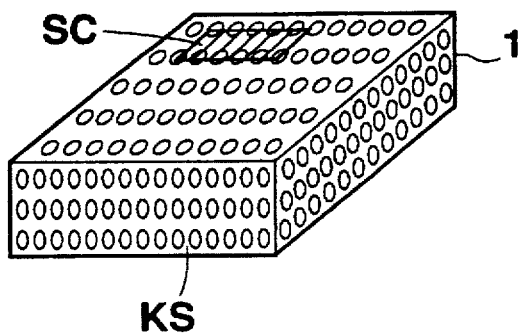
FIG. 1 is a perspective view of an article which is handled by a shopping basket according to the present invention, particularly showing a valid state of the article.

The invention will be described hereinafter with reference to an embodiment shown in the drawings.

Article Status

Figure 2:
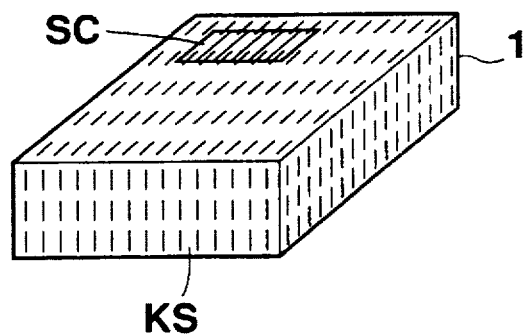
FIG. 2 is a view similar to FIG. 1, but showing an invalid state of the article.

FIGS. 1 and 2 show an article 1 to be put into a shopping basket 2 with an accounting function. The article 1 carries an identification code SC such as a bar code, and a status code KS in at least binary form. The status code KS is present over the entire surface of the article 1 as shown in FIG. 1. Alternatively, the status code KS may be locally present on the surface of the article 1. The status code KS is realized by a recording medium which assumes a non-magnetized state "0" or a magnetized state "1", and is electrically set ("1") or reset ("0"). In the following description, a code 1 (denoting an "invalid" state) is assigned to an article 1 which is actually put into the shopping basket but whose price is not added to the amount. Conversely, a code 0 (denoting a "valid" state) is assigned to an article 1 which is put into the shopping basket and whose price is correctly calculated. Further, the articles keep the code "0" as long as they are present in showcases.

With the present invention, the articles are packaged by a material whose reflection characteristics vary with magnetism or light beams as described below. Specifically, when such a material receives magnetism or light beams having an intensity higher than a threshold value, it becomes active and reduces its reflectance. Conversely, when the magnetism or light beams are weaker than the threshold value, the material becomes active to increase its reflectance.

A status code writing mechanism (to be detailed later) applies electric signals having two levels (e.g. electromagnetic or optical signals) to an article when it passes through an article registering mechanism (to be detailed later). In this invention, application of intensive light beams denotes the valid state (0) of the article, while application of moderate light beams denotes the invalid state (1) of the article.

Further, a status code reading mechanism (to be detailed later) applies predetermined light beams to a moving article, and measures a maximum value of light beams reflected from the article, thereby obtaining status information in binary form. In the present invention, the status code reading mechanism illuminates the article at a plurality of points thereof, and identifies the valid "0" or invalid "1" state of the article according to an amplitude of a maximum value of the reflected light beams. A larger maximum value of the reflected light beams denotes the valid state "0", while a smaller maximum value denotes the invalid state "1".

Therefore, when the article placed into the invalid state "1" by the status code rewriting mechanism is illuminated by the status code reading mechanism, the article has a small reflectance. When illuminated by the status code reading mechanism, the article reflects a small amount of light. Thus, the article is identified to be invalid (1). On the other hand, when the status code rewriting mechanism assigns the valid code 0 to the article, the article has a large reflectance. When illuminated by the status code reading mechanism, the article reflects a large amount of light. Accordingly, the article is identified to be valid (0).

Alternatively, it is possible to use an average value obtained by a quantizing algorithm in place of the maximum value of reflected light. Further, it is possible to use both the foregoing maximum value of reflected light and the average value obtained by the quantizing algorithm.

Configuration of the Shopping Basket With the Accounting Function

Figure 3:
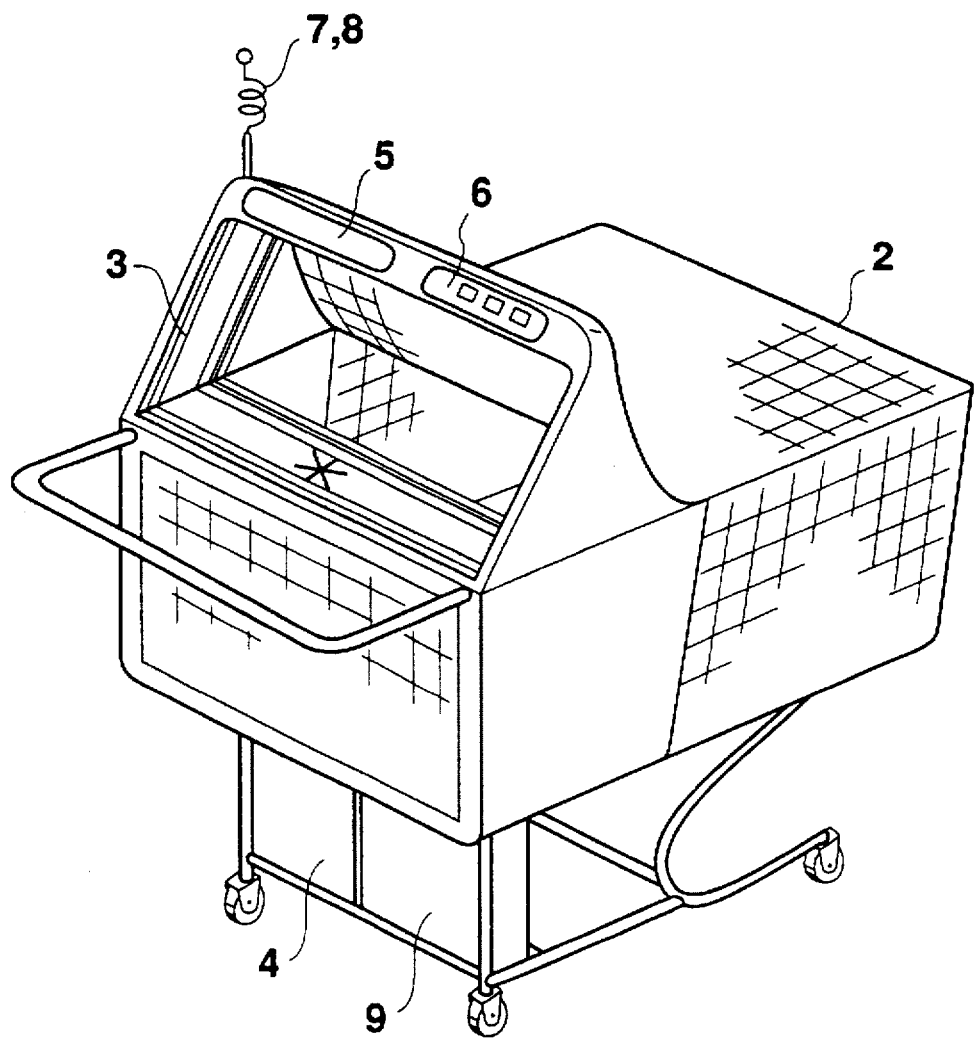
FIG. 3 is a perspective view of the shopping basket with an accounting function according to one embodiment of the present invention.

The shopping basket 2 with the accounting function is structured as shown in FIG. 3. In this example, the shopping basket 2 is integral with a handcart. Further, the present invention is applicable not only to a portable shopping basket but also to a shopping basket integral with a power driven cart. The shopping basket 2 includes, at its opening, an article registering unit 3, which reads moving directions of the article, a status code, and an identification code. The articles 1 are always put into the shopping basket 2 only via the article registering unit 3. In other words, the shopping basket 2 is sealed up. Further, the shopping basket 2 includes an accounting control unit 4 (called "calculator 4" hereinafter), a display 5, an alarm 6, a transmitter 7, a receiver 8, and an external memory 9. The calculator 4 registers the article 1 and checks the valid/invalid state thereof on the basis of the data read by the article registering unit 3. The display 5 shows a price of the selected article and a sub-total of the articles present in the shopping basket 2. The alarm 6 alerts the shopper that the price of the article 1 has not been added to or deducted from the sub-total indicated by the display 5, or that he or she cannot continue shopping due to some problem. The transmitter 7 transmits accounting data (e.g. shopping basket number, valid statuses of the articles in the shopping basket, and data on the articles in the shopping basket) to the accounting unit when the shopping basket 2 arrives at a cashier's counter. The receiver 8 receives from a host computer programs and article information (e.g. identification code, name of the article, standard unit price, and discount rate). The external memory 9 stores the foregoing information.

Article Registering Unit

Figure 4:
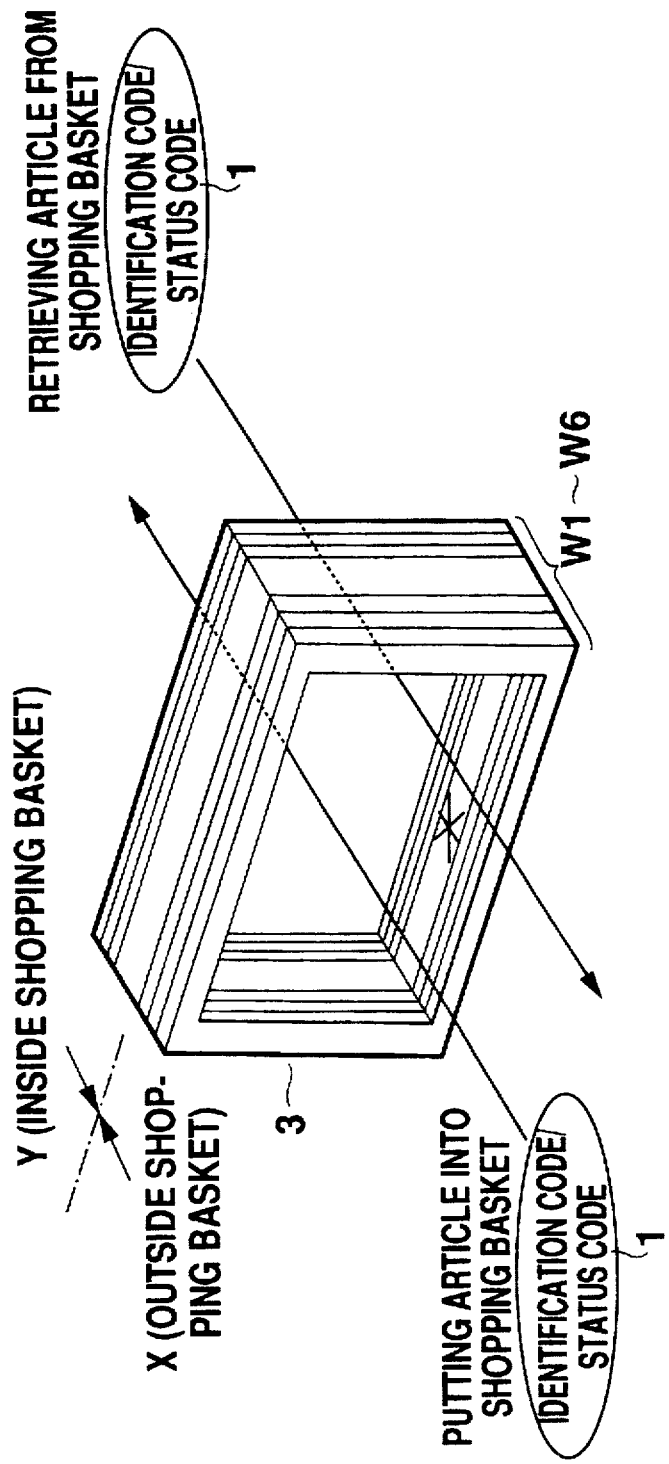
FIG. 4 is a perspective view of an article registering mechanism of the present invention.
Figure 5:
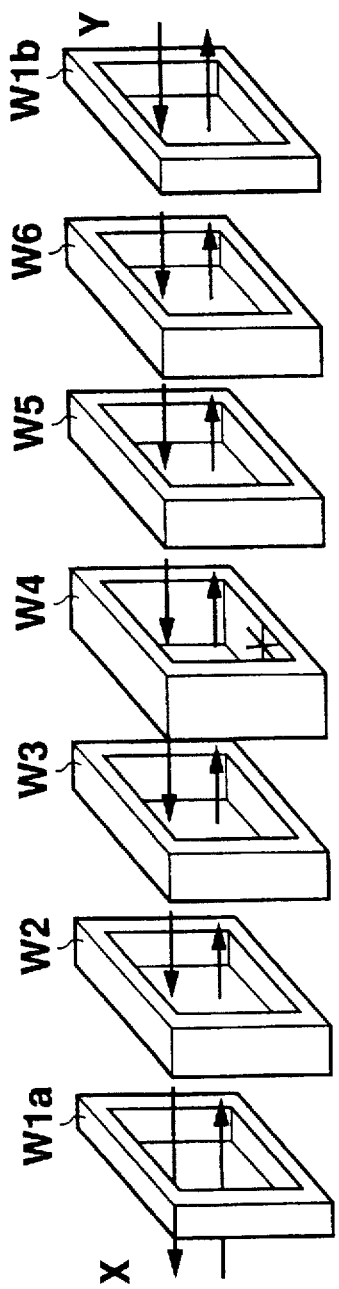
FIG. 5 shows how an article passes through the article registering mechanism when it is put into or retrieved from the shopping basket.

FIG. 4 is a perspective view of the article registering unit 3 at the opening of the shopping basket 2. In FIG. 5, the letter X denotes a space outside the shopping basket 2, and Y denotes a space in the shopping basket 2. When an article is selected, it is put into the shopping basket 2 from the space X to the space Y. Conversely, when the article is retrieved from the shopping basket 2, it is moved from the space Y to the space X. The article registering unit 3 includes a pair of direction detecting elements W1a and W1b detecting the directions of movement of the article, a pair of status code reading elements W2 and W6, a pair of status code rewriting elements W3 and W5, and a scanner W4. The status code reading elements W2 and W6 read the status code of the article 1. The status code rewriting elements W3 and W5 rewrite the status code on the article 1. The scanner W4 reads the identification code on the article 1. As shown in FIGS. 4 and 5, the foregoing elements W1a, W2, W3, W4, W5, W6, and W1b are arranged in this order from the direction X to the direction Y of the shopping basket 2. Therefore, the article 1 passes through the elements W1a, W2, W3, W4, W5, W6 and W1b to reach the interior of the shopping basket 2. Conversely, when it is retrieved from the shopping basket 2, the article 1 passes through the reverse route, i.e. W1b, W6, W5, W4, W3, W2, and W1a.

When the article 1 is put into the shopping basket 2 via the route between W1a and W1b, it is checked by the direction detecting element W1a. On the other hand, when the article 1 is retrieved from the shopping basket 2 via the route between W1b and W1a, it is checked by the direction detecting element W1b. The operation sequences of the foregoing elements depend upon the moving directions of the article 1. Thus, the direction detecting elements W1a and W1b are positioned at an entrance and an exit of the article registering unit 3. The shopper is required to put or retrieve the article 1 into or from the shopping basket 2 letting only the identification code SC be illuminated by light from the scanning element W4.

Article Accepting Algorithm

The article checking/accepting algorithm will be described with reference to FIG. 6 to FIG. 14. It is assumed here that the article 1 has a price n, and a sub-total of articles actually present in the shopping basket 2 is N. Unless otherwise specified, it is also assumed that at an initial stage of shopping, the sub-total N is equal to an amount which is calculated on the basis of identification codes. The shopping basket is operated according to the article checking/accepting algorithm.

Figure 6:
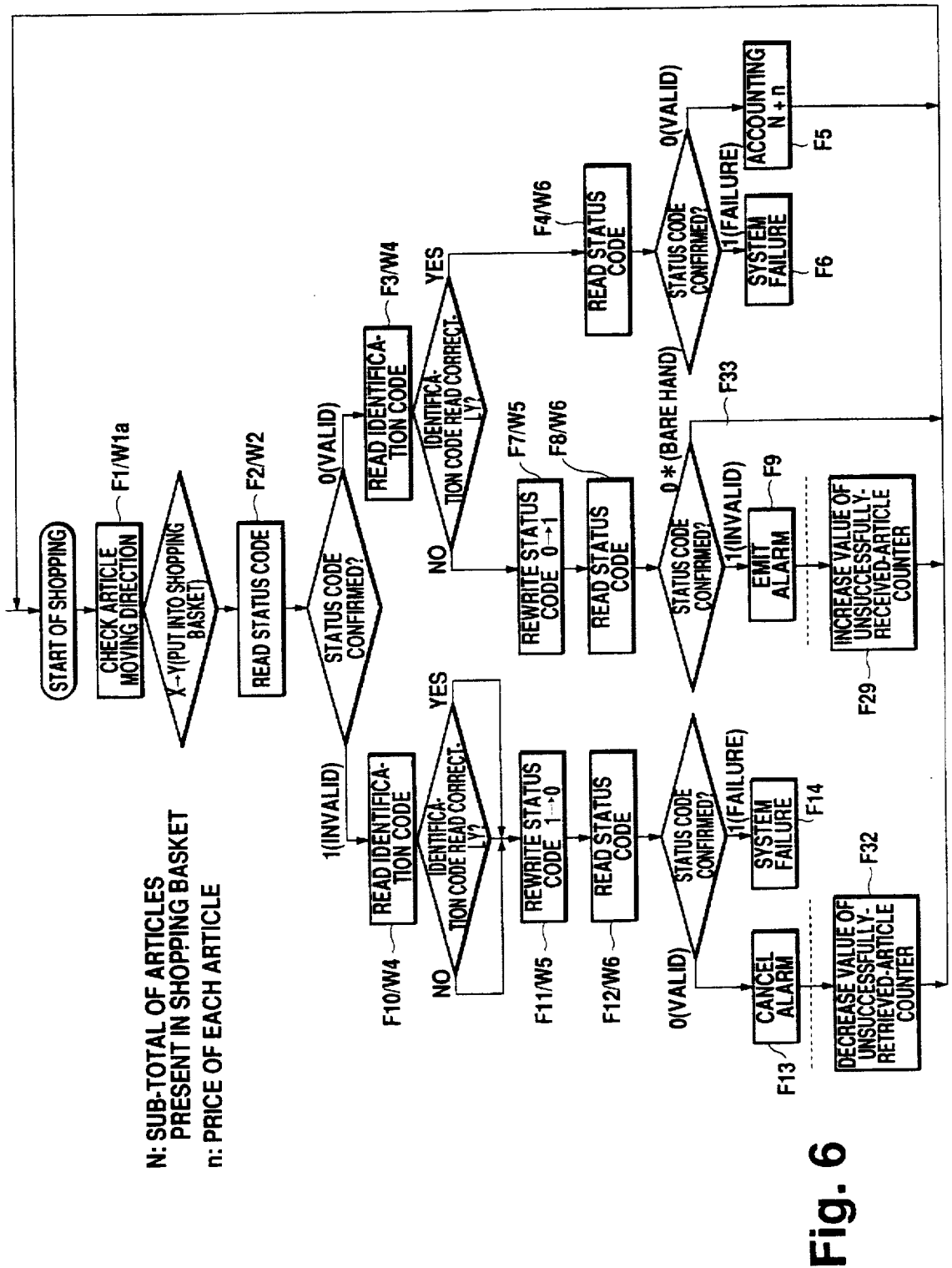
FIG. 6 is a flowchart of an article checking/accepting algorithm for putting an article into the shopping basket.

When the article 1 is put into the shopping basket 2, its moving direction X→Y is detected by the direction detecting element W1a in step F1 shown in FIG. 6. In step F2, the article status code reading element W2 reads the status code KS on the article 1. When the status code KS is "0" and when the identification code SC is correctly read by the scanning element W4 in step F3, the status code KS is read again by the other status code reading element W6 in step F4. When KS=0, the price n of the article 1 is added to the current sub-total N. In this state, the sub-total N+n is equal to the sub-total N+n calculated based on the identification codes. The article 1 maintains its valid status (0) and is successfully received in the shopping basket 2. Therefore, no alarm will be emitted. Conversely, if the article 1 is rejected in step F4, i.e. the status code KS is confirmed to be "1", this state is contradictory to the state (i.e. KS=0) identified by the status code reading element W2. Therefore, the article checking/accepting algorithm will be suspended in step F6, and system failure will be notified to a host computer. Re-reading of the status code in step F4 is effective to detect a problem in the status code reading element W2 or W6. The foregoing operation is executed as shown in part (a) of FIG. 8.

If the status code KS is confirmed to be "0" in step F2 but the identification code SC is not correctly read, the price n of the article 1 is not known, so that the current sub-total N cannot be updated. In this state, the current sub-total N is not in agreement with a new sub-total N+n of the articles present in the shopping basket 2. Therefore, the status rewriting element W5 rewrites the status code SC to "1" (invalid) in step F7. Immediately after this, in step F8, the status code reading element W6 reads the status code to confirm that it is really "1". In step F9, an alarm will be given to the shopper to notify her or him of this state in step F9, and the status code checking will be completed. This operation is executed as shown in part (a-1) of FIG. 8, this state, the shopper has to retrieve the article 1 from the shopping basket 2. The alarm will remain on until the shopper retrieves the article 1.

Figure 7:
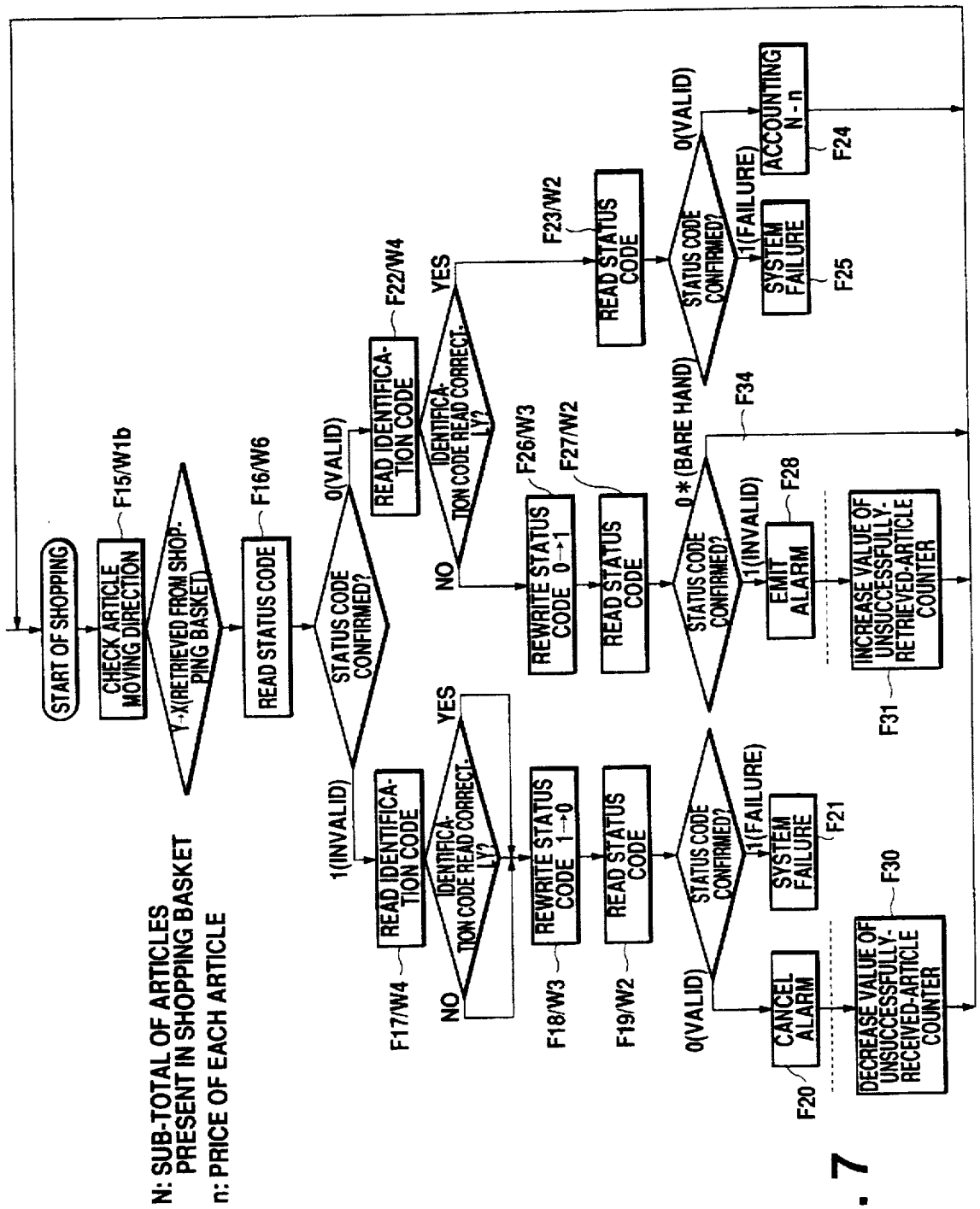
FIG. 7 is a flowchart of another article checking/accepting algorithm for retrieving an article from the shopping basket.
Figure 8:
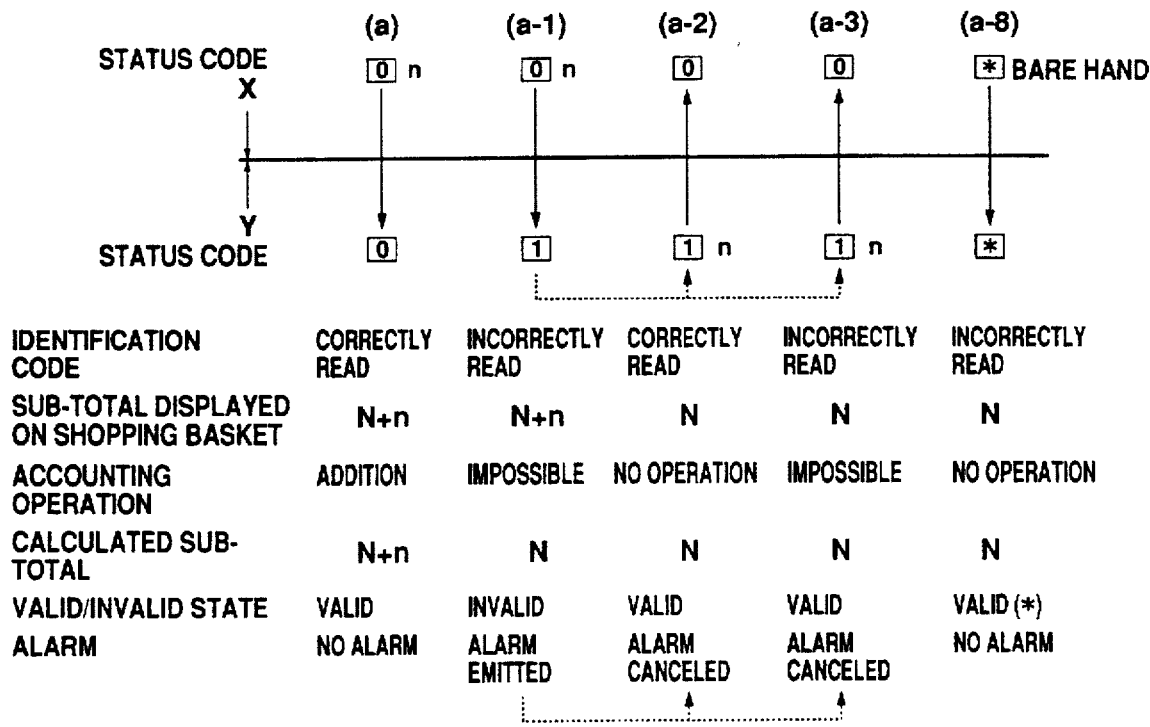
FIG. 8 shows a sequence of the article checking/accepting algorithm on the basis of a valid/invalid status of the article.
Figure 9:
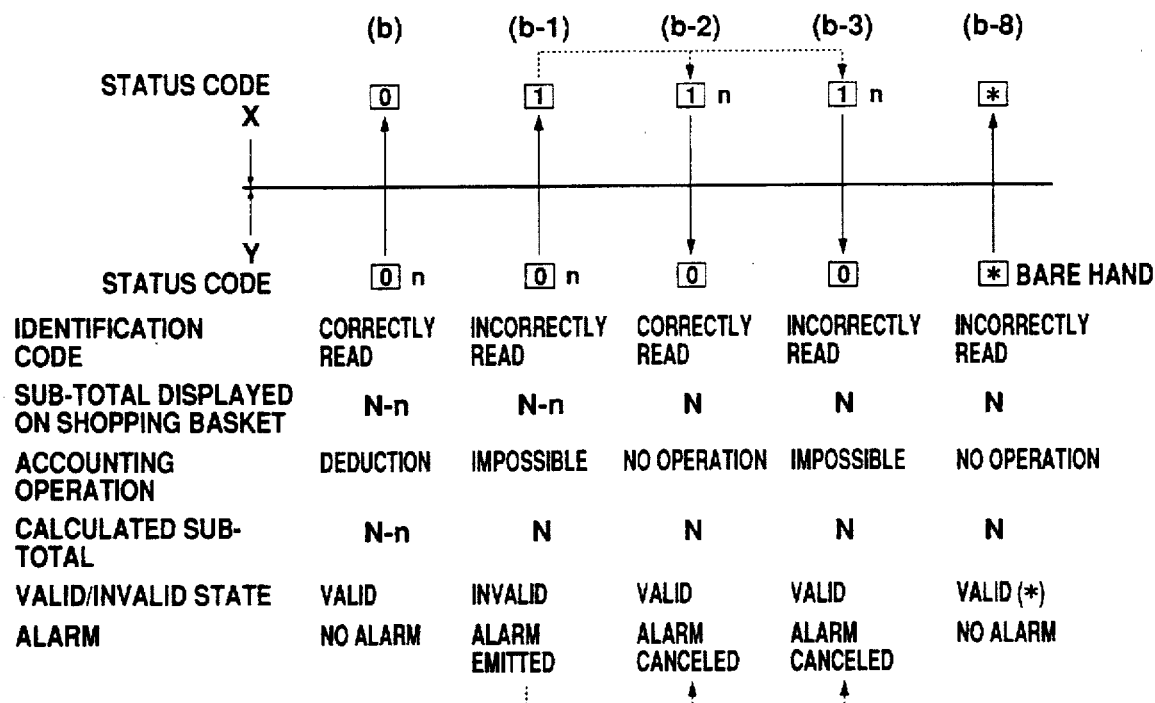
FIG. 9 shows another sequence of the article checking/accepting algorithm on the basis of the valid/invalid status of the article.

To cancel the invalid state (KS=1), the shopper retrieves the invalid article 1. As shown in FIG. 7, the direction detecting element W1b detects the moving direction Y→X of the retrieved article 1 in step F15. Then, the status code reading element W6 reads the status code of the article 1. The article 1 whose status code is "1" has not been added the current sub-total N when it was put into the shopping basket 2. After the retrieval of the article 1, the sub-total N displayed on the shopping basket 2 definitely agrees with the sub-total N of the articles remaining in the shopping basket 2. Therefore, regardless of a read result of the identification code in step F17, the status code SC can be set to "0" by the status code rewriting element W3 in step F18. In step F19, the status reading element W2 reads the status code SC and confirms its "0" (valid) state. Thereafter, the alarm will be canceled in step F20. In this embodiment, the scanning element W4 is designed so as to be continuously ready to read the identification code. Therefore, if the identification code of the article whose status code is "1" is correctly read, nothing is deducted from the current subtotal, i.e. no addition is executed. A sequence of the foregoing operation is shown at (a-2) and (a-3) of FIG. 8. On the other hand, if the status code SC is identified to be "1" by the status code reading element W2 in step F19, this is contradictory to the contents (KS=0) set by the status rewriting element W3. Therefore, the alarm will be emitted in step F21 to notify of the system failure.

As described above, when the invalid article 1 is retrieved from the shopping basket 2, it is considered to become valid. Thus, the sub-total of the articles present in the shopping basket 2 becomes equal to the sub-total displayed on the shopping basket 2. In this state, the shopper again puts the retrieved article into the shopping basket as before. If the article is successfully received in the shopping basket 2, the shopper can continue his or her shopping. Conversely, if the shopper does not want the retrieved article, he or she simply returns it to a showcase.

When a valid article 1 is retrieved from the shopping basket 2 for some reason, the direction detecting element W1b checks the moving direction Y→X of the article in step F15 as shown in FIG. 7. In step F16, the status code KS is read by the status code reading element W6. When the status code KS is 0 (i.e. valid) and the identification code SC is correctly read in step F22, the status code reading element W2 reads the status code KS to confirm that it is 0. Thereafter, the price n of the retrieved article 1 is deducted from the current subtotal N. In this state, the sub-total N-n of the articles present in the shopping basket 2 coincides with the sub-total N calculated on the basis of the identification codes. In this state, no alarm will be emitted. On the other hand, when the article 1 is identified to have the status code 1 (i.e. invalid) in step F23, this state differs from the state (KS=0) read by the status code reading element W6, so that the system failure will be alerted in step F25. Re-reading of the status code is effective to detect malfunction of the status code reading element W2 or W6. The foregoing operation is shown at (b) of FIG. 9.

When the retrieved article is identified to have the status code "0" in step. F16 but if the identification code is not correctly read in step F22, the price of this article is not known, so that the current sub-total cannot be updated. In this state, the sub-total N-n of the articles present in the shopping basket 2 differs from the sub-total N displayed on the shopping basket 2. Thus, the status code rewriting element W3 rewrites the status code to "1" (invalid) in step F26. Immediately after step F26, the status code reading element W2 reads, in step F27, the status code to confirm that it still remains at "1". In step F28, the invalid state of the article 1 is notified to the shopper. Then, the status code checking will be suspended. The foregoing operation is shown at (b-1) of FIG. 9. Therefore, the shopper has to return the retrieved article into the shopping basket 2 to cancel the invalid state. The alarm will continue until the invalid state is cleared.

Referring to FIG. 6, the direction detecting element W1a checks the moving direction X→Y of the article which has been retrieved but is returned into the shopping basket due to its invalid state (KS=1). Then, the status code reading element W2 reads the status code KS on the article in step F2. When the status code KS of the article is still "1", it means that the price n of the article has not been deducted from the sub-total during the retrieval. Therefore, when the article is returned into the shopping basket, the sub-total N of the articles present in the shopping basket is definitely equal to the sub-total N displayed on the shopping basket. Regardless of the read result of the identification code SC in step F10 (FIG. 6), the status code KS is rewritten to "0" (valid) by the status code rewriting element W5 as is done in step F11. Immediately thereafter, the status code reading element W6 reads the status code KS to confirm that it is "0", thereby releasing the alarm indicating the invalid state as is done in step F13.

In this embodiment, the scanning element W4 is designed so as to be continuously ready to read the identification code SC of each article passing therethrough. Even if the identification code of the article having the status code "1" is correctly read, no addition is performed because of the presence of the status code "1". A sequence of the foregoing operation is shown at (b-2) and (b-3) of FIG. 9. If the status code is identified to be "1" in step F12, it differs from the contents (KS=0) set by the status code rewriting element W5, so that the system failure will be alerted. Thereafter, the operation will be suspended.

As described above, when the invalid article is returned into the shopping basket 2, it is considered to become valid. Thus, the sub-total of the articles remaining in the shopping basket 2 becomes equal to the sub-total displayed on the shopping basket 2. In this state, if the shopper again retrieves the article from the shopping basket, the article is checked with respect to its status. After the retrieved article is identified to be valid, the shopper may return it to a showcase. Conversely, if the shopper wants the article in question, he or she simply leaves it in the shopping basket 2.

During shopping, the shopper may happen to put his or her hand into the shopping basket to place articles in or retrieve articles therefrom. In other words, an object without the status code or the identification code may pass through the article registering unit 3. The article status checking/ accepting algorithm of the present invention also identifies such an object (referred to as "bare hand" hereinafter), and controls the system not to execute the accounting operation and alarming.

The moving direction X→Y of the bare hand is also detected by the direction detecting element W1a as with an article put into the shopping basket 2. Next, in step F2, the status code reading element W2 tries to read a status code. However, since the bare hand does not have any status code and is not electrically read and memorized, it is identified to be 0* (i.e. seemingly valid). Therefore, the scanning element W4 cannot function because of the absence of an identification code. In step F7, the status code rewriting element W5 sets the status of the bare hand to "1" (i.e. invalid). In step F8, the status code reading element W6 tries to read a status code of the bare hand, and cannot memorize it electrically. In other words, the bare hand is identified to be 0*. Thus, the no accounting operation will be executed in step F33. The foregoing procedure is shown at (a-8) in FIG. 8.

Withdrawal of the bare hand from the shopping basket will be processed as with the retrieval of the article therefrom. First of all, the moving direction Y→X of the bare hand is detected by the direction detecting element W1b. In step F16, the status code reading element W6 tries unsuccessfully to read the status code. The bare hand is recognized to have the status 0* (i.e. quasi-valid). Next, the scanning element W4 tries unsuccessfully to scan the identification code, and sets the bare hand to the status "1" (i.e. invalid). Thereafter, in step F27, the status code reading element W2 tries unsuccessfully to perform its function. The bare band is recognized to have the status 0*. Thus, the no accounting operation will be executed in step F34. The foregoing operation is shown at (b-8) in FIG. 9.

As described above, when the status code is not electrically memorized (i.e. identified to be 0=valid) and when the identification code is not correctly read, the status code rewriting element tries unsuccessfully to electrically memorize the status code of the bare hand (i.e. to put the bare hand in the invalid state "1"). If the status code cannot be rewritten to "1", the presence of the bare hand is confirmed. Thereafter, the no accounting operation will be performed. Conversely, if the status code can be set, it is considered that the invalid state is present. Thereafter, the operation for the invalid status will be carried out in step F9 or F28.

An actual shopping procedure comprises a forward step in which the article in the shopper's hand is put into the shopping basket via the article registering unit 3 (FIG. 3) and is registered by the accounting unit, and a backward step in which the shopper's hand is withdrawn from the shopping basket 2. Retrieval of an article from the shopping basket comprises a forward step in which the shopper's hand is put into the shopping basket via the article registering unit 3 and a backward step in which the article is taken out from the shopping basket via the article registering unit 3.

Figure 13A:
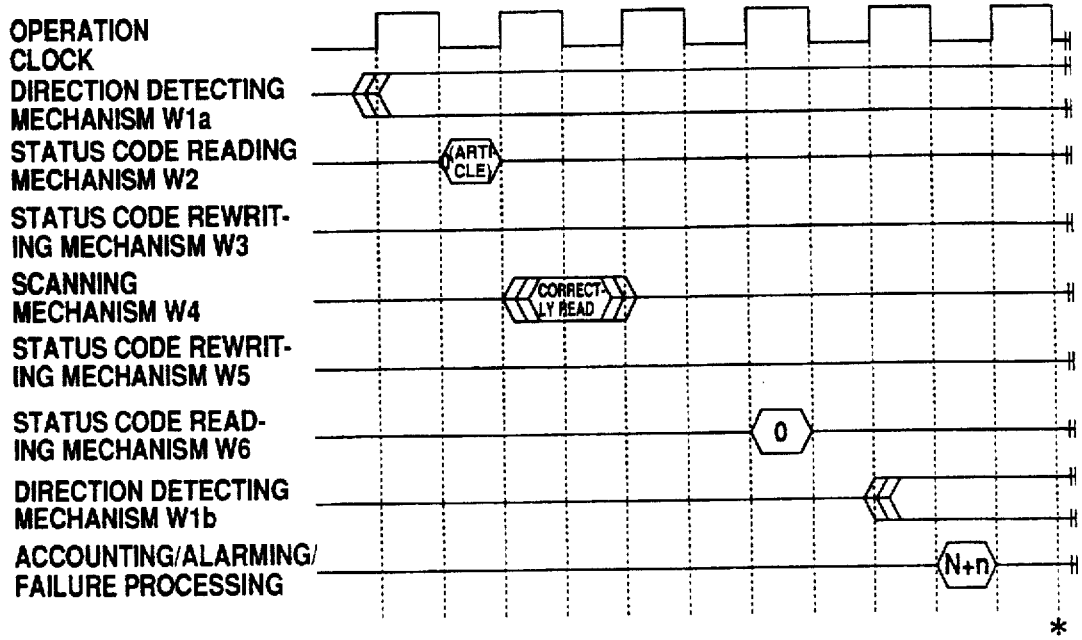
FIG. 13A is a time chart of the article checking/accepting algorithm when a selected article is put into the shopping basket.
Figure 13B:
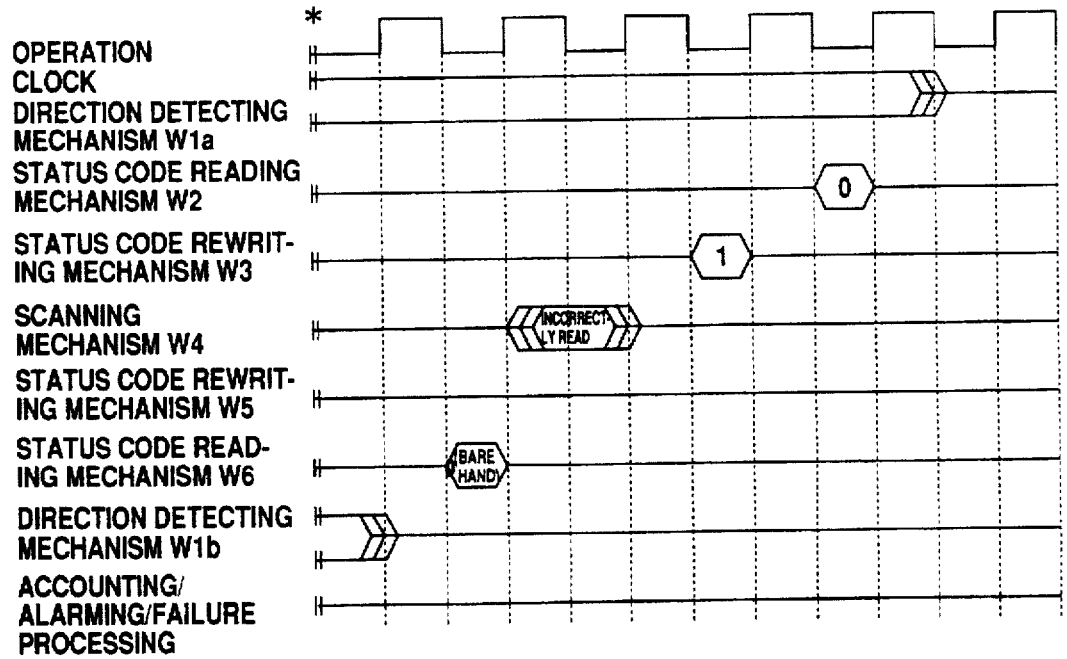
FIG. 13B is a continuation of FIG. 13A.
Figure 14A:
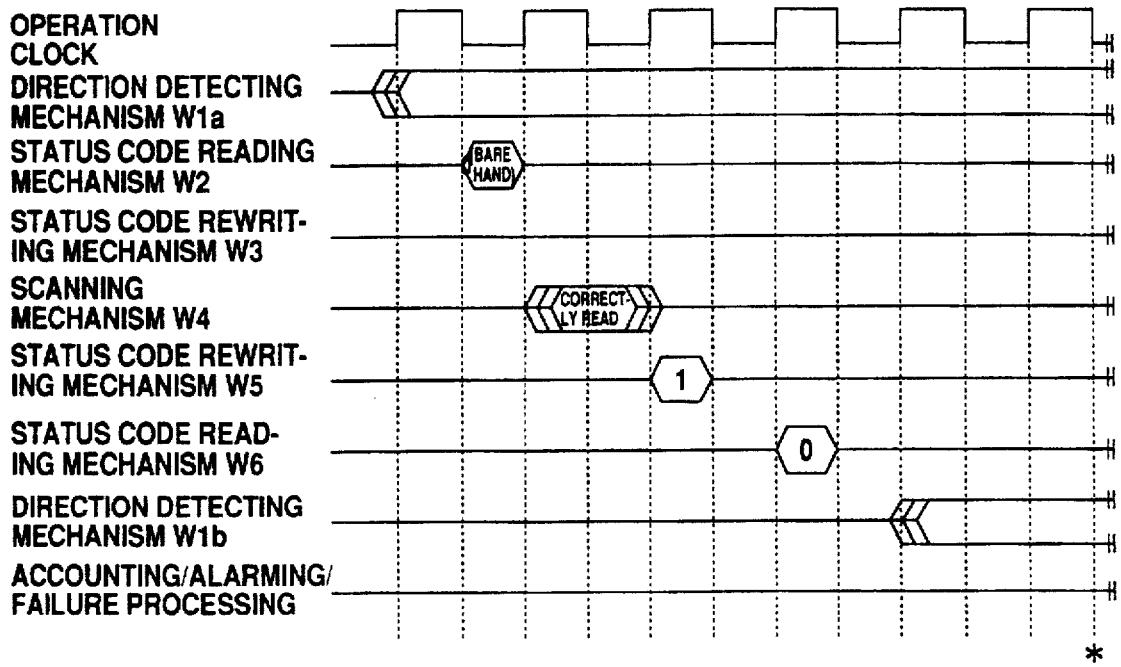
FIG. 14A is a time chart of the article checking/accepting algorithm when the article is retrieved from the shopping.
Figure 14B:
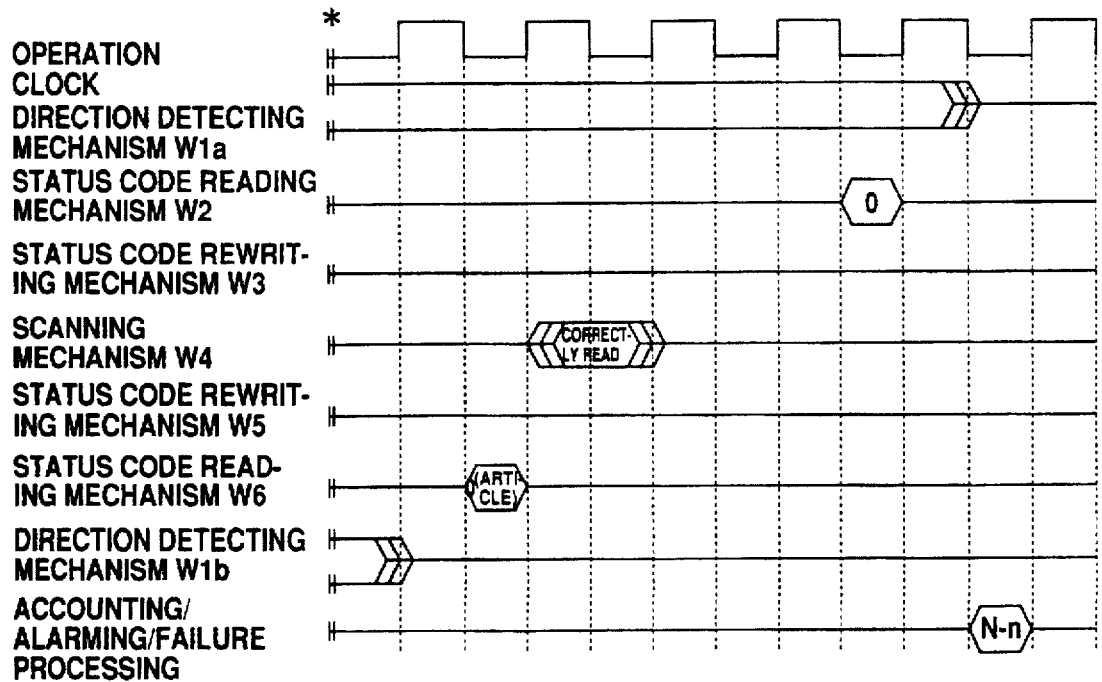
FIG. 14B is a continuation of FIG. 14A.

Referring to FIGS. 13A, 13B, 14A and 14B, examples of the operation timing for the article checking/accepting algorithm will be described hereinafter. FIGS. 13A and 13B show that the identification code of the article put into the shopping basket is successfully registered. FIGS. 14A and 14B show that the identification code of the retrieved article is successfully registered. Specifically, FIGS. 13A and 14A shows the operation sequence in the forward steps. On the other hand, FIGS. 13B and 14B show the operation sequences in the backward steps. FIG. 13B is a continuation of FIG. 13A, and FIG. 14B is a continuation of FIG. 14A. These figures are connected at a portion marked *.

When an article is identified as invalid, the system urges the shopper to remove it from the shopping basket. Thereafter, the shopper can return the retrieved article to a showcase or put it into the shopping basket again. Then, the shopper can restart shopping after the article becomes valid.

Alternatively, it is also possible to enable the shopper to continue his or her shopping without retrieval of the invalid articles if extra counters are provided to count such invalid articles. The rejected articles are classified into those which become invalid while they are being put into the shopping basket, and those which become invalid while they are being retrieved from the shopping basket. Each time an article is unsuccessfully received in the shopping basket 2, a counter for such an article increases its count by one (1). Conversely, each time such an invalid article is retrieved from the shopping basket, the counter decreases its count by one (1). This counter is called an "unsuccessfully-received-article counter". Further, each time an article is unsuccessfully retrieved from the shopping basket, a counter for such an article increases its count by one (1). This counter decreases its count by one (1) when the article is returned and successfully received in the shopping basket. This counter is called an "unsuccessfully-retrieved-article counter".

In this embodiment, the unsuccessfully-received-article counter increases its count each time an article is not successfully received in the shopping basket 2 in step F29 shown in FIG. 6 (i.e. becomes invalid). On the other hand, this counter decreases its count each time such the invalid state of the article is cleared in step F30 shown in FIG. 7.

The unsuccessfully-retrieved-article counter increases its count each time an article is not successfully retrieved from the shopping basket 2 in step F31 shown in FIG. 7 (i.e. becomes invalid). On the other hand, this counter decreases it count when the invalid state of the retrieved article is cleared in step F32 in FIG. 9.

Both of the foregoing counters are initially set to zero (0).

Figure 10:
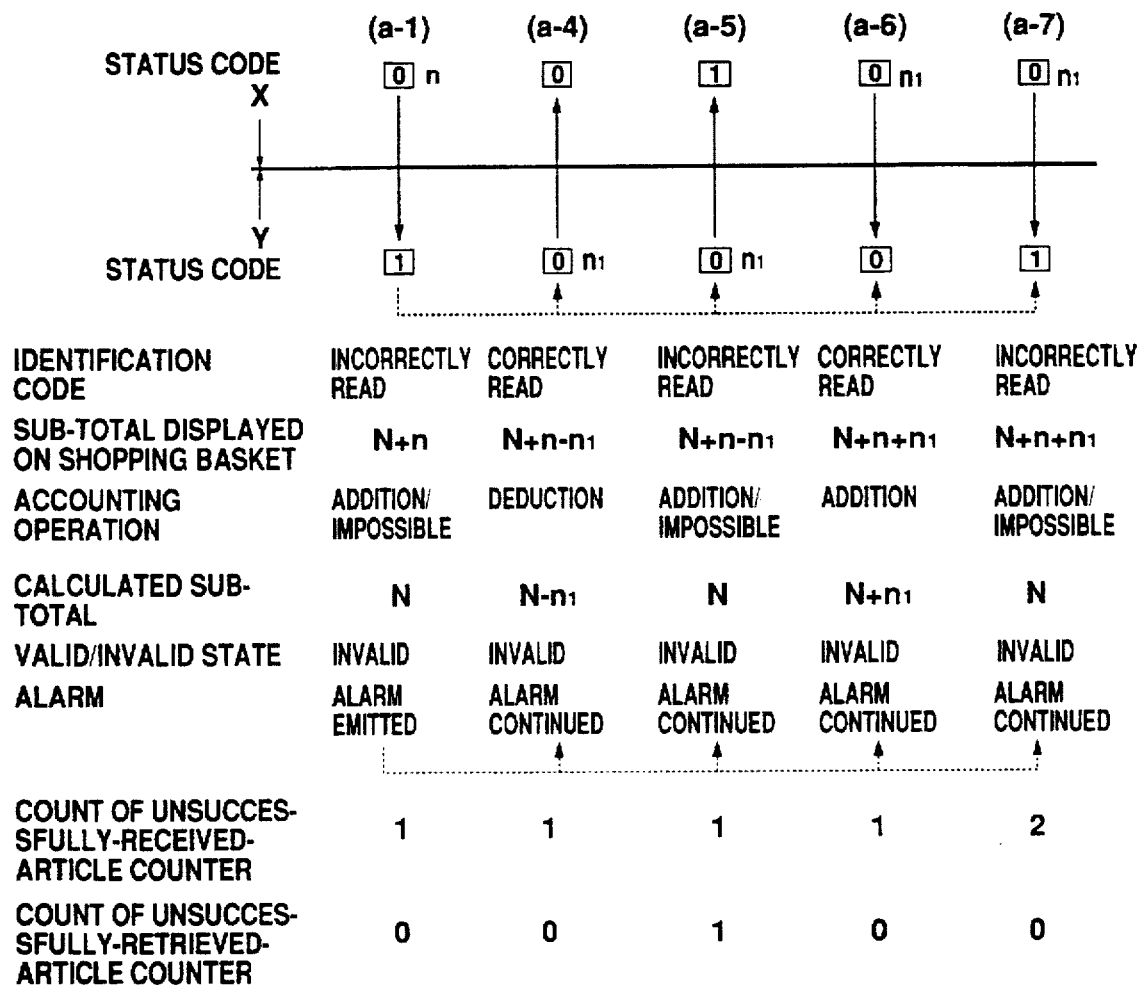
FIG. 10 shows statuses of operations of an unsuccessfully-received-article counter and an unsuccessfully-retrieved-article counter according to the article checking/accepting algorithm, particularly showing the invalid state of an article whose price is n and whose identification code is not read correctly.

The following describe a procedure which enables the shopper to continue his or her shopping regardless of whether the invalid articles (KS=1) are inside or outside the shopping basket. In other words, the invalid article may remain in the shopping basket, or may be returned to a showcase. FIG. 10 shows, at (a-1), that an identification code of an article with price n is not correctly read and that the article is identified to be invalid. This state is similar to that shown at (a-1) in FIG. 8. In this state, the unsuccessfully-received-article counter indicates "1", while the unsuccessfully-retrieved-article counter indicates "0".

Assume that, in the state (a-1), the invalid article with the price n is left in the shopping basket 2 but another article carrying the price $n_1$ is retrieved from the shopping basket 2. When the identification code of the article with the price $n_1$ is correctly read, the unsuccessfully-retrieved-article counter holds its count at "0" as shown at (a-4) in FIG. 10. Conversely, when the identification code of this article is not read correctly, the unsuccessfully-retrieved-article counter increases its count by one "1" as shown at (a-5) in FIG. 10.

Further, assume that, in the state (a-1), an invalid article with the price n remains in the shopping basket but another article with the price $n_1$ is successfully received in the shopping basket 2. In this state, the unsuccessfully-received-article counter holds its count at "1" as shown at (a-6) in FIG. 10. Conversely, if the article with the price $N_i$ is not successfully received in the shopping basket 2, the unsuccessfully-received-article counter increases its count by one and indicates "2" as shown at (a-7) in FIG. 10.

Figure 11:
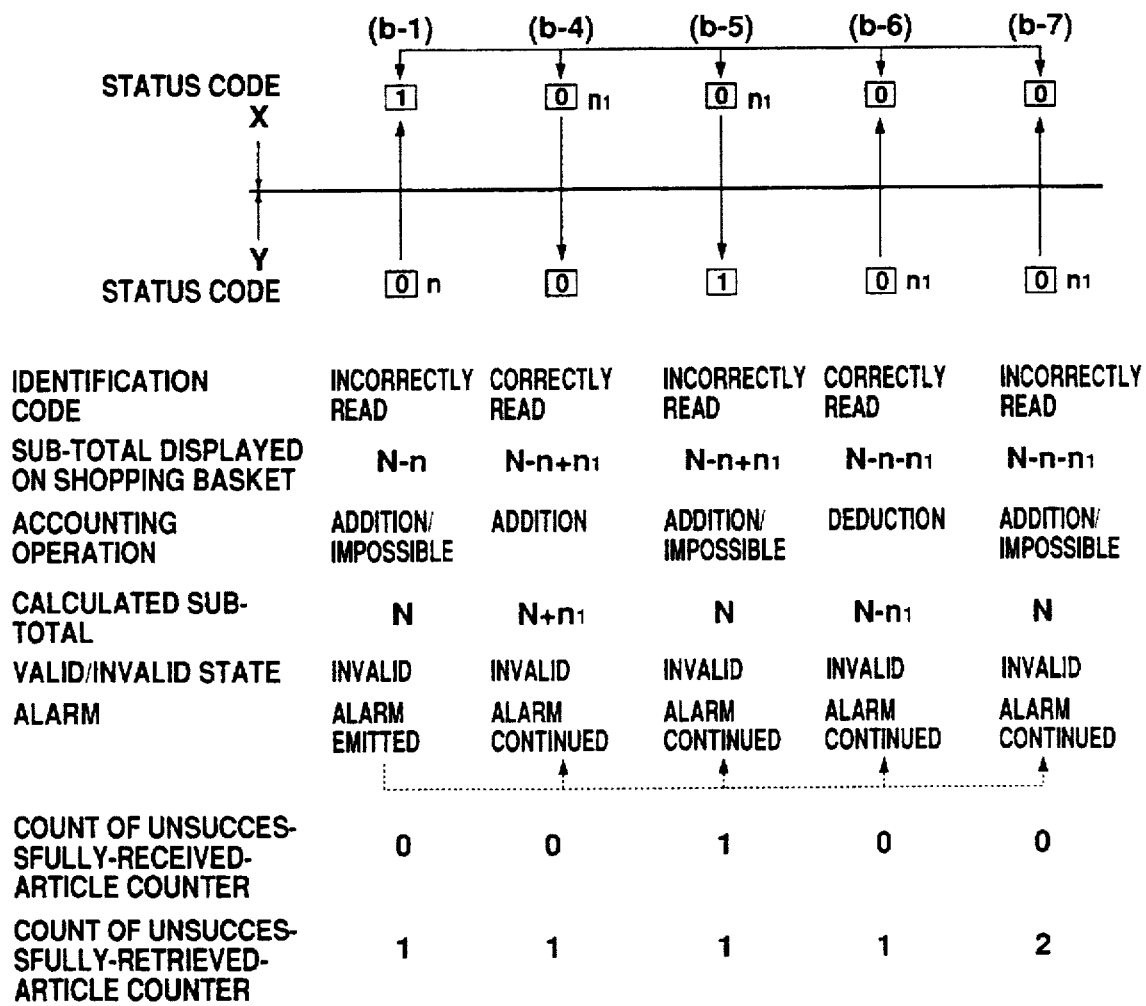
FIG. 11 is a view similar to FIG. 10, but specifically showing the invalid state of an article which is retrieved from the shopping basket and has a price n, and whose identification code is not read correctly.

FIG. 11 shows at (b-1) that an article with the price n is not successfully retrieved from the shopping basket 2. The unsuccessfully-received-article counter indicates "0" while the unsuccessfully-retrieved-article counter maintains its count at "1". This state is similar to the state shown at (b-1) in FIG. 9.

Now, assume that the invalid article with the price n is left in the shopping basket 2 and another article with the price $n_1$ is successfully received in the shopping basket 2. Then, the unsuccessfully-received-article counter maintains its count at "0" as shown at (b-4) in FIG. 11. Conversely, when the article with the price $n_1$ becomes invalid, the unsuccessfully-received-article counter increases its count by one and indicates "1" as shown at (b-5) in FIG. 11.

Further, assume that, in the state shown at (b-1) in FIG. 11, the invalid article with the price n is left in the shopping basket 2, and another article with the price $n_1$ is successfully retrieved therefrom. The unsuccessfully-retrieved-article counter maintains its count at "1" as shown at (b-6) in FIG. 11. On the contrary, when the retrieval of the article is not successful, the unsuccessfully-retrieved-article counter increases its count by one, thereby indicating "2".

Figure 12:
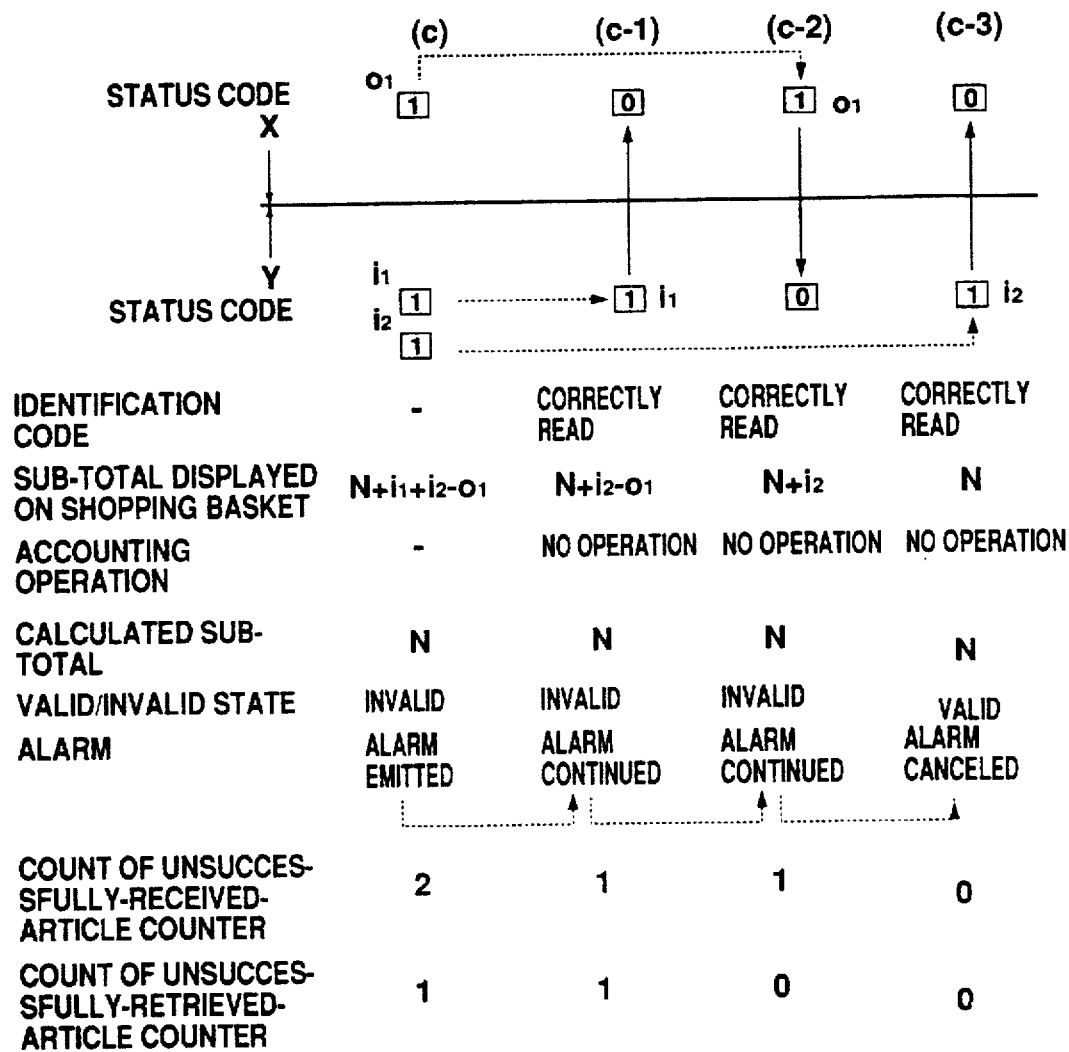
FIG. 12 shows operation sequences of the unsuccessfully-received-article counter and unsuccessfully-retrieved-article counter according to the article checking/accepting algorithm, particularly showing that an article which has a price $O_1$ is identified to be invalid and is retrieved from the shopping basket, and articles whose prices are $i_1$ and $i_2$ and which are not correctly read by the scanner are left in the shopping basket, and the invalid state of these articles is cleared.

FIG. 12 exemplifies states of the unsuccessfully-received-article counter and the unsuccessfully-retrieved-article counter. In this case, it is assumed that an invalid article with the price $o_1$ is retrieved from the shopping basket but invalid articles with prices $i_1$ and $i_2$ are left in the shopping basket. The state of the shopping basket prior to the status check is as shown at (c) in FIG. 12. Specifically, the unsuccessfully-received-article counter indicates "2", while the unsuccessfully-retrieved-article indicates "1". When the invalid article with the price $i_1$ is successfully retrieved from the shopping basket in the state (c-1) shown in FIG. 12, the unsuccessfully-received-article counter decreases its count and indicates "1" while the unsuccessfully-retrieved-article counter maintains its count "1".

FIG. 12 shows at (c-2) that the retrieved article with the price $o_1$ is successfully put into the shopping basket 2 again. In this state, the unsuccessfully-retrieved-article counter decreases its count by one and indicates "0". On the contrary, the unsuccessfully-received-article counter keeps on indicating "1".

When the invalid article with the price $i_2$ is successfully retrieved from the shopping basket in the state (c-3) shown in FIG. 12, the unsuccessfully-received-article counter decreases it counts and indicates "0". In this state, both the unsuccessfully-received-article counter and the unsuccessfully-retrieved-article counter indicate "0", which represents that all the articles in the shopping basket are valid. In this embodiment, the alarm for the invalid articles continues until both of the foregoing counters indicate "0".

As can be seen from the foregoing description, the three procedures (c-1), (c-2) and (c-3) may be performed in a desired sequence or combination. Further, it is also possible to put any articles into the shopping basket or retrieve any articles from the shopping basket in the foregoing operation sequence.

With the invention, the unsuccessfully-received-article counter indicates the number of invalid articles present in the shopping basket. On the other hand, the unsuccessfully-retrieved-article counter indicates the number of articles which are not successfully retrieved from the shopping counter and have the invalid status outside the shopping basket. According to the indication on these counters, the shopper can know the number of invalid articles inside and outside the shopping basket 2. The shopper is required to clear the invalid state of the articles before the shopping basket arrives at the cashier's counter. When there is no limitation for the number of invalid articles in one shopping trip, there may be problems, for example, the shopper may not be able to locate invalid articles in the shopping basket, which might prevent reliable operation of the system. Therefore, it is preferable to set maximum values for both of the foregoing counters.

System for Operating the Foregoing Shopping Basket

Figure 15:
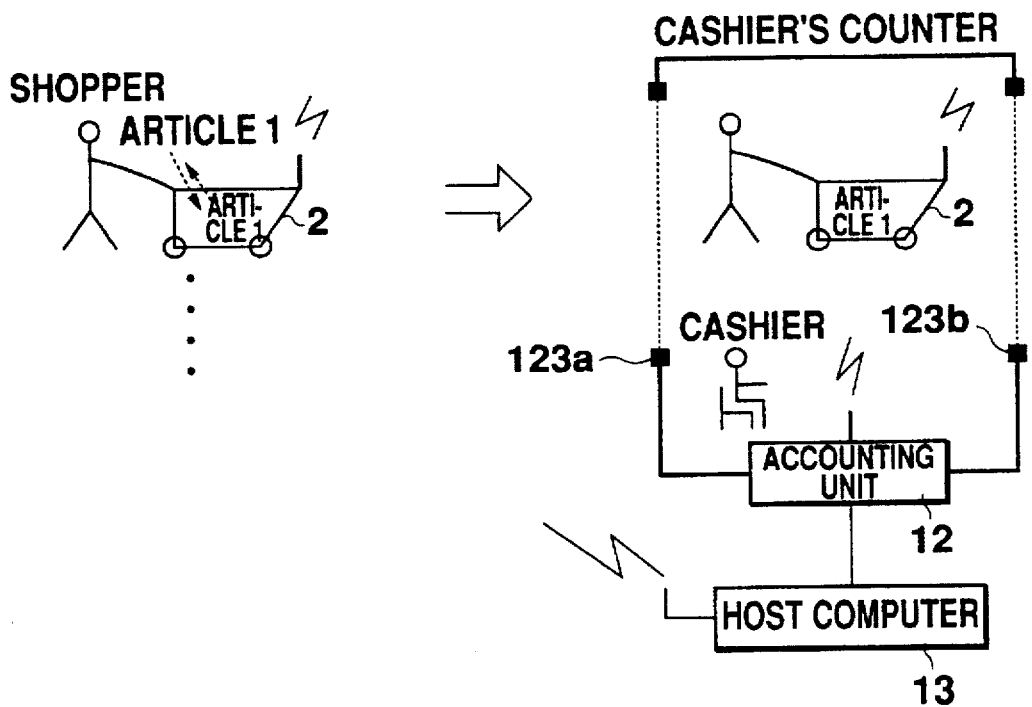
FIG. 15 shows the configuration of a system for operating the shopping basket with the accounting function according to the first embodiment of the invention.
Figure 16:
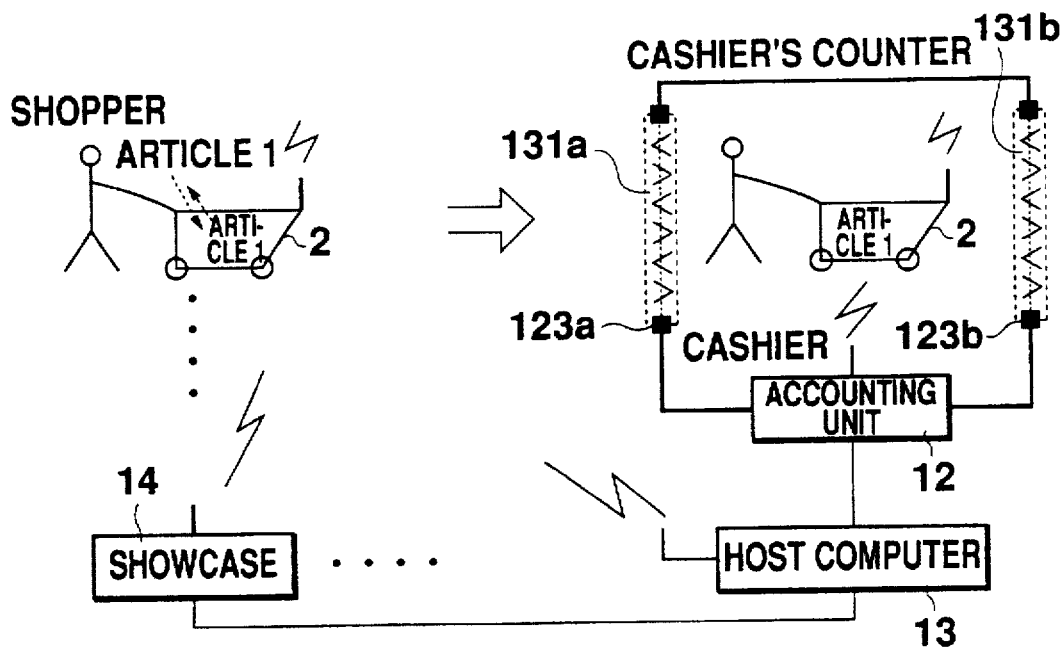
FIG. 16 shows the configuration of a system for operating the shopping basket according to a second embodiment.

FIGS. 15 and 16 shows configurations of the system for operating the shopping basket with the accounting function.

Referring to FIG. 15, a shopper brings the shopping basket 2 loaded with articles so as to pay a bill by cash. The system shown in FIG. 16 also includes a showcase which can transmit information on sale articles, new articles and so on to the shopping basket 2. The shopper carries the shopping basket 2 to the cashier's counter to pay the bill by credit or banker's cards. The system of FIG. 16 differs greatly from the system of FIG. 15 in that credit or banker's cards are acceptable for payment of the bill. Therefore, the cashier's counter can be unattended.

Figure 17:
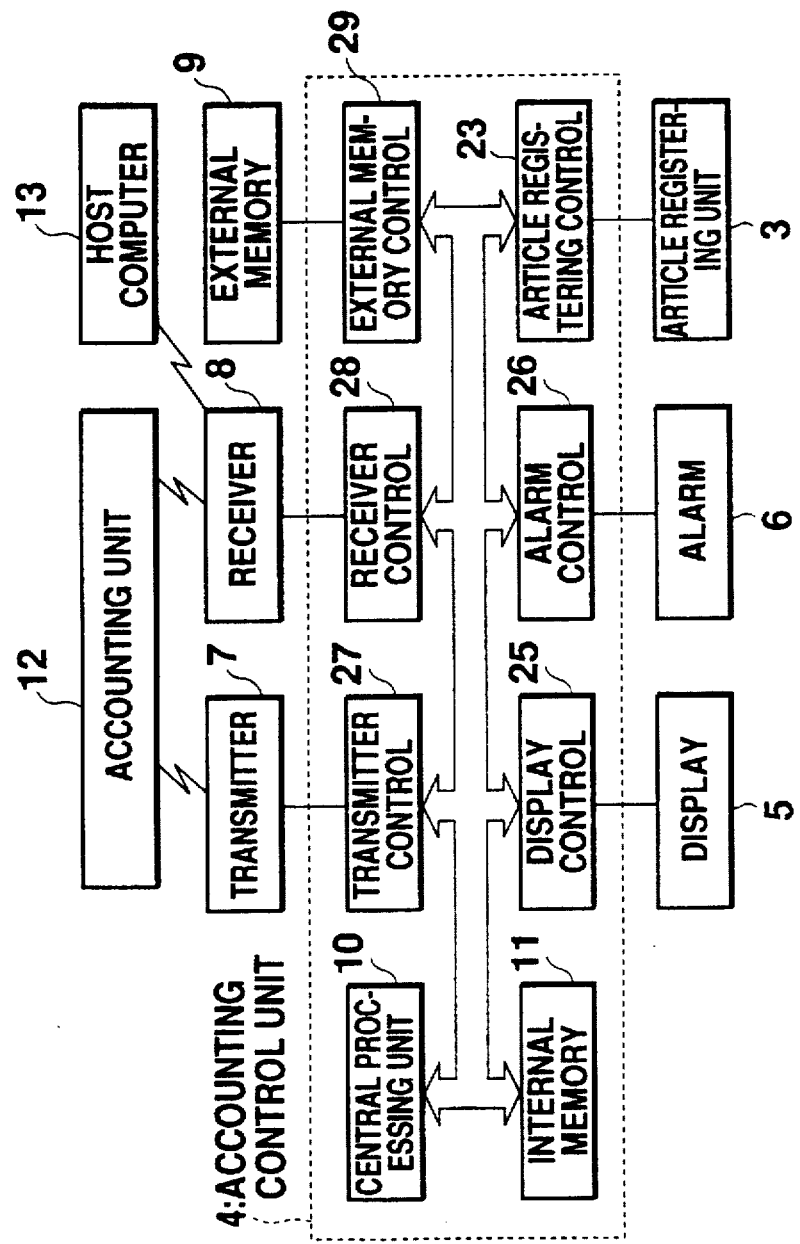
FIG. 17 is a block diagram of the accounting system.

FIG. 17 is a block diagram of the system for operating the shopping basket. An accounting control unit 4 comprises a central processing unit 10 for controlling the accounting operations, an internal memory 11, an article registering unit 3, a display 5, an alarm 6, a transmitter 7, a receiver 8, an external memory 9, and controls 23, 25, 26, 27, 28 and 29 for interfacing to the foregoing devices 3, 5, 6, 7, 8, and 9.

Figure 18:
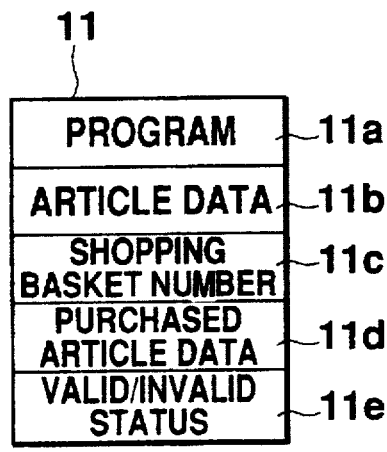
FIG. 18 shows the configuration of an example of an internal memory of the accounting unit.

Referring to FIG. 18, the internal memory 11 stores a program 11a for operating the shopping basket system, article data 11b (e.g. identification codes, article names, standard unit prices, and discount rates), shopping basket data 11c, being numbers assigned to respective shopping baskets, accounting data 11d on purchased articles (e.g. identification codes, article names, selling prices, quantity, sub-total and grand total), and valid status data 11e. Further, when invalid articles are counted, data 11f concerning the unsuccessfully-received-article counter and data 11g concerning the unsuccessfully-retrieved-article counter are stored in the internal memory 11. Still further, when the shopping basket can receive data such as sale articles, new articles and so on from the showcase, sales information 11h is also stored in the internal memory 11.

Figure 20:
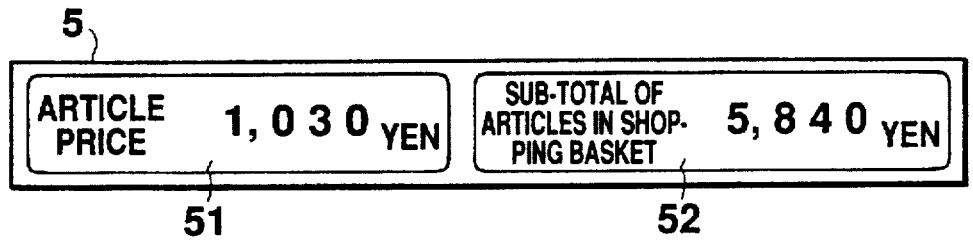
FIG. 20 shows an example of a display given on the shopping basket.
Figure 21:
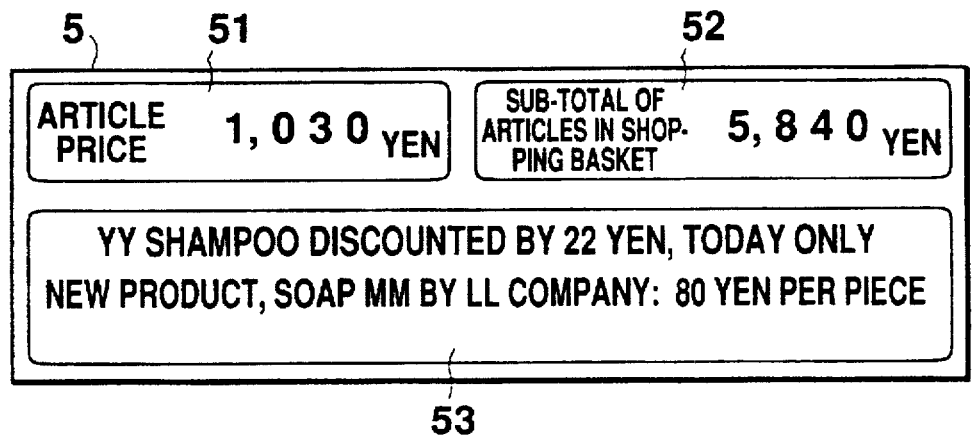
FIG. 21 shows another example of the display given on the shopping basket.

As shown in FIG. 20, the display 5 indicates the name and price of the last received or retrieved article at a part 51 thereof, and an updated total of the purchased articles at a part 52 thereof. When the shopping basket can receive sales information from the showcase, such information is indicated at a part 53 as shown in FIG. 21.

Figure 22:
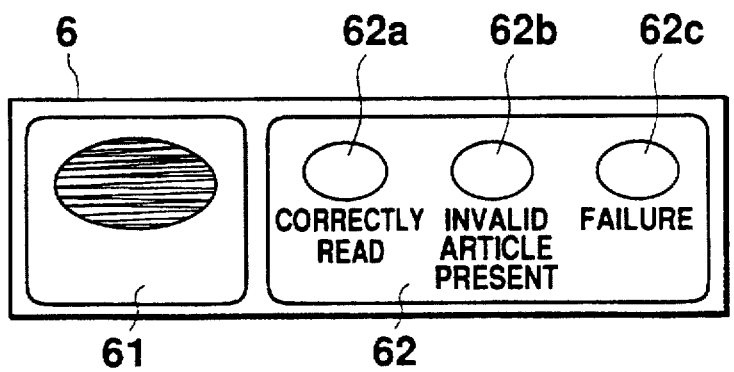
FIG. 22 shows an example of a warning displayed on the shopping basket.

Referring to FIG. 22, the alarm 6 includes a buzzer part 61 and a lamp part 62. The buzzer part 61 emits a recorded beep when the article is successfully received in the shopping basket and the sub-total indicated on the display 5 is correctly updated. Conversely, each time the article is identified as invalid, the buzzer part 61 emits a 3-beep alarm. If there is a system failure preventing the shopper from shopping, the buzzer part 61 emits a warning tone. The alarm will be active until the invalid state of the article is removed. The warning tone will be stopped only after the invalid state is cleared by a store clerk (or a supervisor) or after the shopping basket 2 is reset by the store clerk. The lamp member 62 includes a valid state lamp 62a, an invalid state lamp 62b, and a failure lamp 62c. The valid state lamp 62a is lit during the emission of the valid state beep. The invalid state lamp 62b blinks during the emission of the invalid state beep. The failure lamp 62c blinks during the emission of the warning tone.

Figure 19:
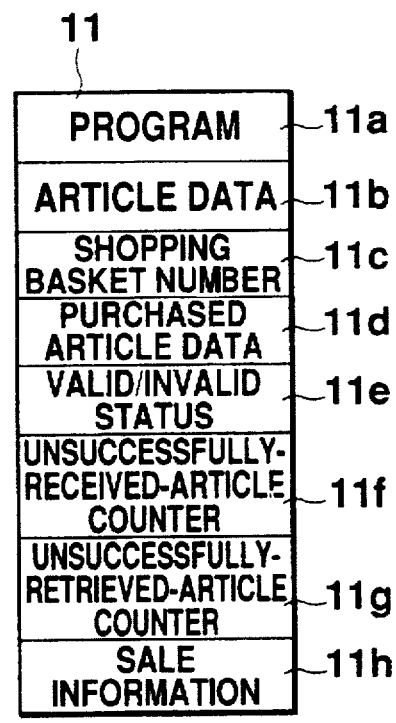
FIG. 19 shows the configuration of a further example of the internal memory in the accounting unit.
Figure 23:
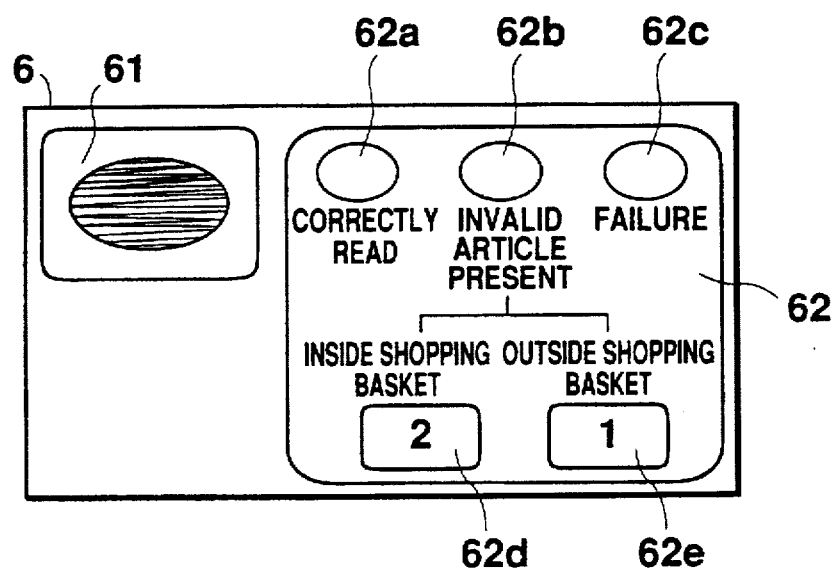
FIG. 23 shows another example of the warning displayed on the shopping basket.

FIG. 23 shows the configuration of the alarm 6 when the unsuccessfully-received-article counter and unsuccessfully-retrieved-article counter are used. The data 11f on the unsuccessfully-received-article counter shown in FIG. 19 are indicated in a space marked "Inside the shopping basket", and the data 11g on the unsuccessfully-retrieved-article counter are shown in a space marked "Outside the shopping basket". A cathode-ray tube (CRT) or liquid crystal display (LCD) may be used for the lamp part of the foregoing display 5 and the alarm 6. The valid and invalid article beeps and the warning tone may be replaced by verbal message instead of the buzzer.

When the shopping basket 2 arrives at the cashier's counter, its transmitter 7 transmits the data stored in the internal memory 11 in response to a command from the accounting unit 12. Such data include the shopping basket number 11c, the data 11d on the purchased articles, and the valid status data 11e. Further, the data 11f and 11g on the unsuccessfully-received-article counter and unsuccessfully-retrieved-article counter are also transmitted to the accounting unit 12 when such counters are employed.

In the system in which the showcases 14 provide the sale information to the shopping basket 2 as shown in FIG. 16, the shopping basket number data 11c will be notified to a nearest showcase 14 when the shopping basket 2 detects a problem.

The receiver 8 receives the program 11a for operating the shopping basket 2, and the article data 11b (e.g. identification code, name, reference unit price, and discount rate of the article) from the host computer 13. The receiver 8 further receives sale information from a nearest showcase 14 when the showcases 14 shown in FIG. 16 are provided.

The external memory 9 stores the program 11a and the article data 11b received from the host computer 13. The host computer 13 may transmit updated program 11a and article data 11b to the external memory 9 before the store is opened. The internal memory 11 is always ready to receive updated article data 11b from the host computer 13 so that it is responsive to data such as time-limited discount sale.

Accounting Unit

Figure 24:
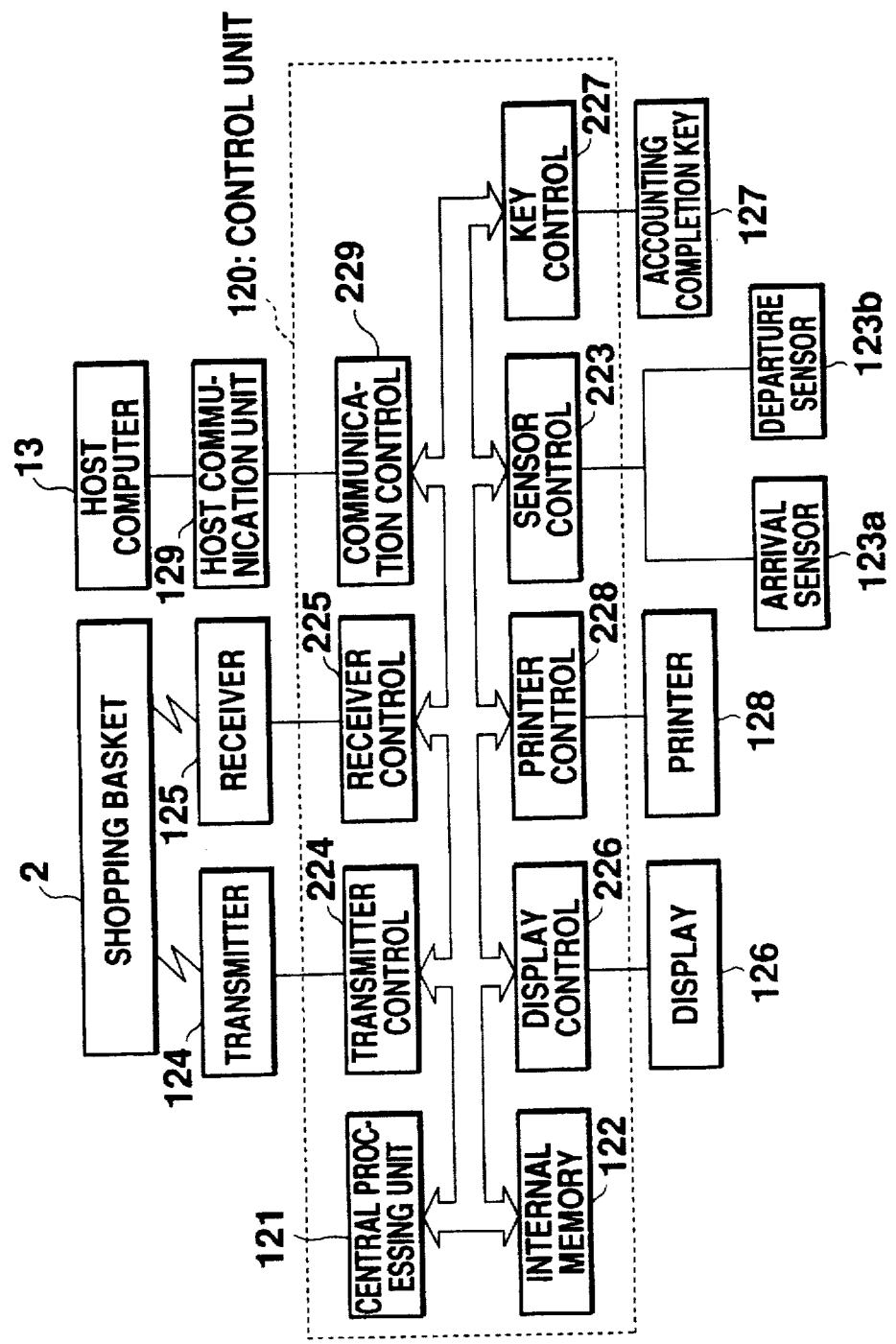
FIG. 24 is a block diagram of an example of the accounting unit.

FIG. 24 is a block diagram showing the configuration of the accounting unit 12 of FIG. 15. In the accounting unit 12, a control unit 120 includes a central control 121, an internal memory 122, and controls 223, 224, 225, 226, 227, 228, and 229 for interfacing to an arrival sensor 123a, a departure sensor 123b, a transmitter 124, a receiver 125, a display 126, an accounting completion key 127, a printer 128, and a host communication unit 129. The controls 223 to 229 control their corresponding devices.

When the arrival sensor 123a detects an approaching shopping basket 2, the accounting unit 12 demands the transmitter 124 of the shopping basket 2 to send the data concerning the shopping basket 2, purchased articles, and valid statuses of the articles. The data received via the receiver 125 are stored in the internal memory 122. When the unsuccessfully-received-article counter and unsuccessfully-retrieved-article counter are used, data on the invalid articles are also transmitted as a part of the valid status data to the accounting unit 12.

A display 126 of the accounting unit 12 indicates the data received from the shopping basket, i.e. the shopping basket number, the valid statuses of articles, and the total of purchased articles. Usually, the shopping basket 2 arrives at the cashier's counter only with the valid articles. However, if the shopping basket 2 carrying at least one invalid article arrives at the cashier's counter, the invalid state of the shopping basket 2 is indicated there. Such an invalid state of the shopping basket 2 will be treated accordingly by the cashier or supervisor.

Upon confirming the valid state of the shopping basket 2 and the absence of the warning tone, the cashier collects the bill from the shopper, and pushes an accounting completion key 127. Then, a receipt will be issued from a printer 128. The sales data are transmitted to the host computer 13 via a host communication unit 129. After the shopping basket 2 passes through the departure sensor 123b, the accounting unit 12 transmits, via the transmitter 124, a command to reset the shopping basket 2. Thereafter, the calculator 4 of the shopping basket 2 will clear the indications on the display 5 so that the shopping basket 2 is usable by a subsequent shopper.

Figure 25:
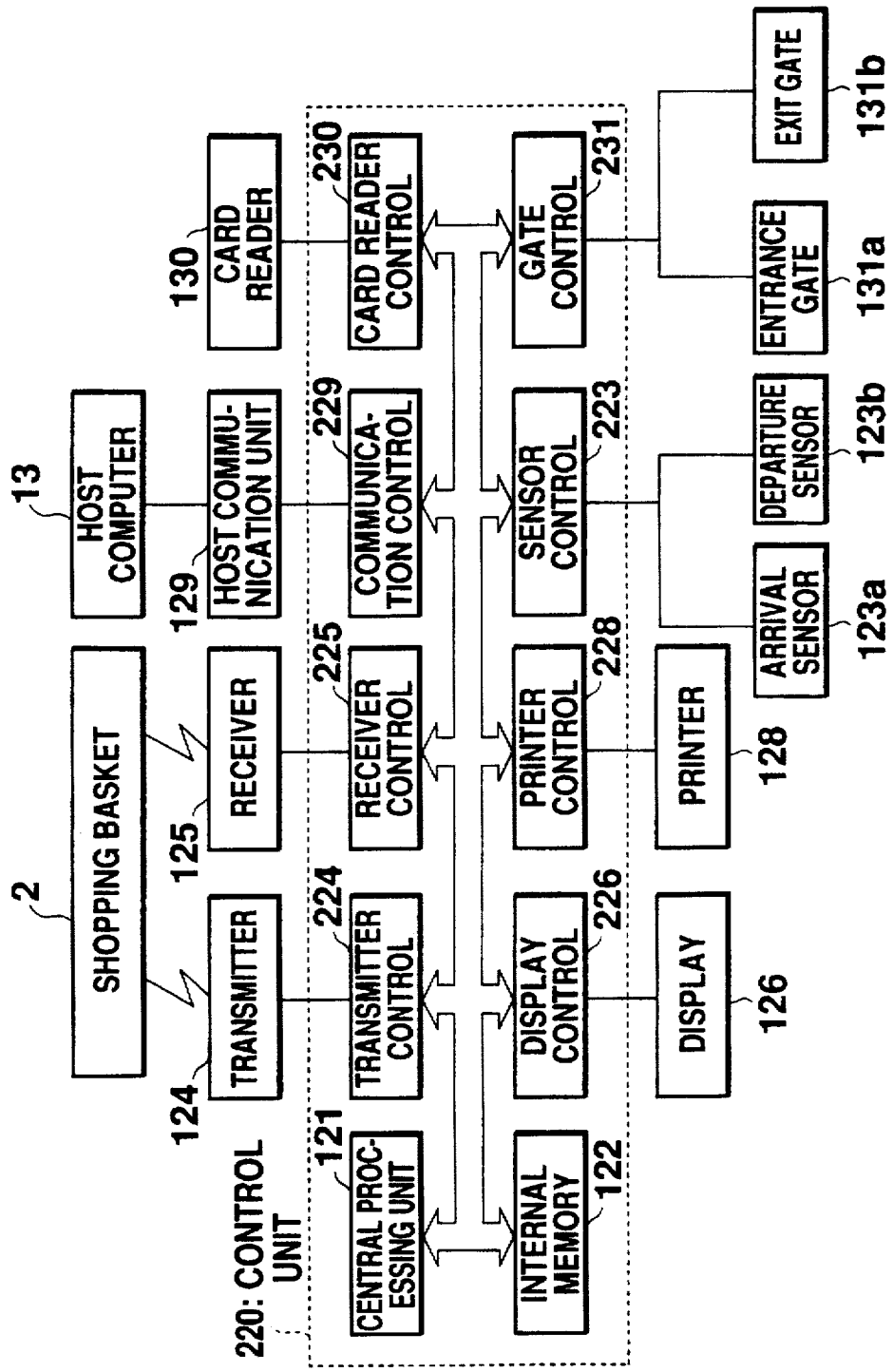
FIG. 25 is a block diagram of another example of the accounting unit.

The operation of the accounting unit 12 shown in FIG. 16 will be described with reference to FIG. 25. In the accounting unit 12, a control unit 220 includes a central processor 121 executing various calculating operations, an internal memory 122 storing the program and so on, a sensor control 223, and control interfaces such as a transmitter control 224, a receiver control 225, a display control 226, a printer control 228, a communication control 229, a card reader control 230, and a gate control 231. The sensor control 223 controls an arrival sensor 123a and a departure sensor 123b. The gate control 231 controls an entrance gate 131a and an exit gate 131b. The remaining controls control their corresponding devices.

When the arrival sensor 123a detects an approaching shopping basket 2, the entrance gate 131a will be opened after the gate control 231 confirms that the previous shopper is no longer there. After confirming that the shopping basket 2 passes through the entrance gate 131a, the accounting unit 12 demands, via the transmitter 124, the shopping basket 2 to send the data concerning the shopping basket number, purchased articles and valid status, and closes the entrance gate 131a. The accounting unit 12 receives the necessary data from the shopping basket 2 via the receiver 125. When both the unsuccessfully-received-article counter and the unsuccessfully-retrieved-article counter are employed, the data concerning these counters are also supplied to the accounting unit 12 as a part of the valid status data. A display 126 at the cashier's counter indicates the data received from the shopping basket 2 including the grand total of the purchased articles. Usually, the shopping basket 2 arrives at the cashier's counter only with the valid articles. Therefore, the shopping basket 2 itself is also valid, so that the shopper confirms the total indicated on the display 126, and settles the bill by a credit or banker's card. When the credit or banker's card is accepted, the bill will actually be settled. Thereafter, a receipt will be issued by the printer 128. The sale information will be sent to the host computer 13 via the host communication unit 129. When the shopping basket 2 passes through the departure sensor 123b, the accounting unit 12 issues, via the transmitter 124, a command to reset the shopping basket 2, thereby opening the exit gate 131b. In response to the command, the calculator 4 of the shopping basket 2 resets the display 5, so that the shopping basket 2 will be ready for subsequent shopping. On the other hand, if the shopping basket 2 arrives at the cashier's counter with at least one invalid article, or if the credit or banker's card is not acceptable, such a problem will be notified to the supervisor via the host computer 13.

Showcase

Figure 26:
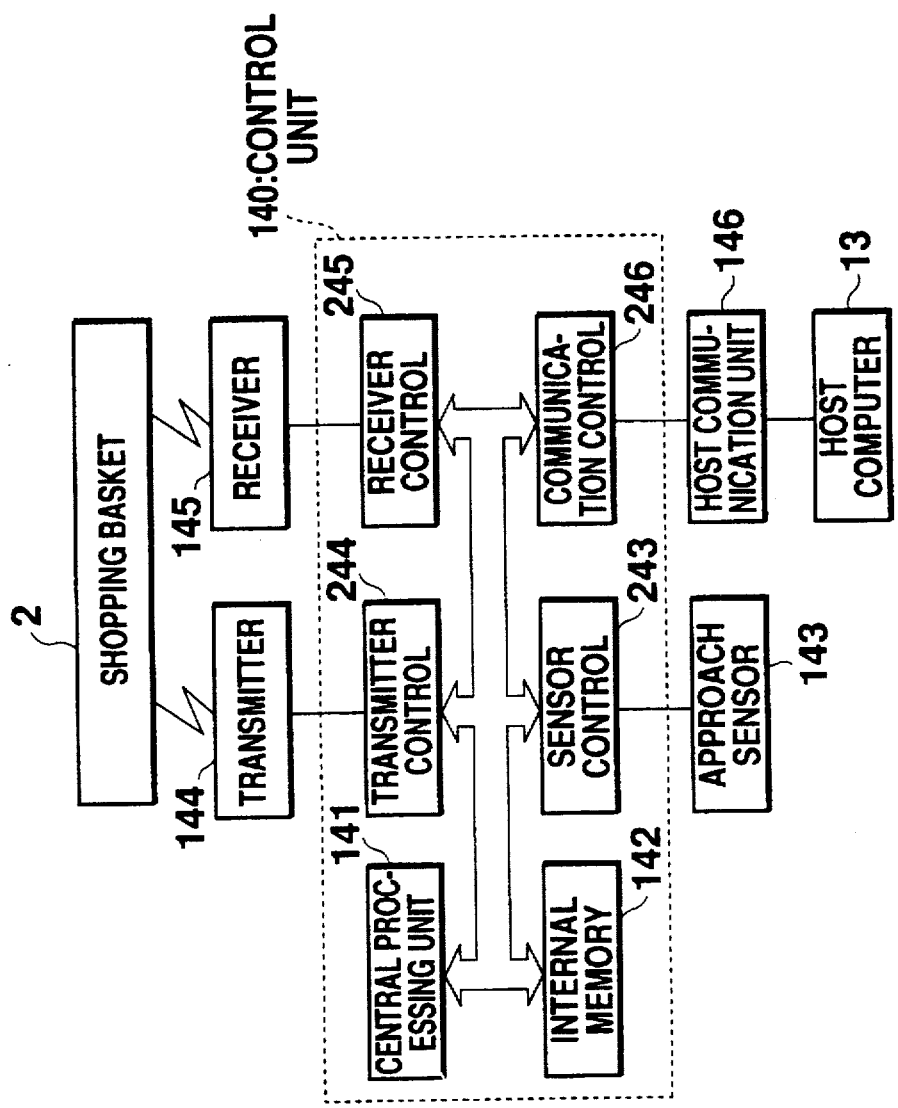
FIG. 26 is a block diagram of devices for a showcase according to the invention.

Referring to FIG. 26, a control unit 140 for showcases 14 includes a central processing unit 141 executing various computing operations, an internal memory 142 storing the program, sale information on discount articles, new articles and so on, and control interfaces for an approach sensor 143, a transmitter 144, a receiver 145 and a host communication unit 146. These control interfaces are a sensor control 243, a transmitter control 244, a receiver control 245, and a communication control 246. The internal memory 142 stores notifications applicable to an entire area of the store and sale information specific to a certain showcase, supplied from the host computer 13.

When the approach sensor 143 detects a shopping basket 2 approaching a showcase 14, the sale information related to the showcase 14 is sent to the shopping basket 2 via the transmitter 144. For example, if system failure is detected during the shopping, the shopping basket 2 informs its own number to the nearest showcase. Receiving the number via the receiver 145, the showcase will transmit the shopping basket number and sale information on its identification data (e.g. the location of the showcase, a name of a selling section, and so on). Once notified of the shopping basket number and the identification data of the showcase in question, the supervisor is dispatched so as to remedy the failure. Although no external memory is provided in this embodiment, an external memory may be provided so as to store the sale information. Further, the information may be transmitted and received between the host computer and the showcase by means of portable media such as the floppy diskets or radio communication system.

The system for operating the foregoing shopping baskets enables establishment of a store where labor-saving can be extensively accomplished.

With the prior art system, there is a problem as described below. When the shopper tries to put an article into the shopping basket by intentionally concealing its identification code, the identification code will not be read correctly. In such a case, a total of the articles calculated on the basis of the identification codes may be less than a total of the articles actually put into the shopping basket. Further, if the identification code of an article which is being retrieved from the shopping basket is not correctly read, a total of the articles calculated on the basis of the identification codes may be larger than a total of the articles which are actually present in the shopping basket. On the contrary, with the present invention, the article statuses are checked regardless of the shopper's intention, so that it is possible to check whether or not the articles which are put into or retrieved from the shopping basket are correctly billed. Specifically, if the identification code is not read correctly, the article in question will be identified as invalid, and an alarm will be emitted to indicate the invalid article. The shopper can clear the invalid state of the article by herself. Further, since the price of an invalid article is not added to a total, the shopper is required only to move the article in a reverse direction so as to clear the invalid state. Therefore, the total calculated based on the identification codes always agree with the total of the articles actually present in the shopping basket.

The invention is described with reference to the embodiment in which the articles carrying the pre-written status code (i.e. valid mark) are purchased using the shopping basket with the accounting function. However, it should be noted that the invention is not limited to such an embodiment but is also applicable to a case in which the articles without the pre-written status code are purchased using such a shopping basket. In such a case, the writer W1a will write the status code on the articles.

According to the present invention, the shopper can do shopping while confirming a total of purchased articles and obtain updated sales information on a real time basis.

The status code checking/accepting algorithm enables checking of the status codes of articles each time they are put into or retrieved from the shopping basket, prices of valid articles to be correctly added or deducted from a current sub-total displayed on the shopping basket, and the shopper to confirm the account prior to going to the cashier's counter. Thus, the shopper can settle her or his bill without having the articles checked at the cashier's counter. Thus, it is possible to save labor and counter space as well as to allow speedy shopping. Further, when an accounting unit is compatible with credit or bankers' cards, no cashiers will be required to settle the account.

What is claimed is:

1. A system for operating shopping baskets with an accounting function, wherein a "valid" mark is written onto a portion of each article, and the "valid" mark is changed to an "invalid" mark when a status code thereof is not read correctly.

2. A system for operating a shopping basket with an accounting function, comprising:

an article writer writing a "valid" mark onto a portion of an article, and a mark writer for changing the "valid" mark to an "invalid" mark when a code on the article is not read correctly.

3. The system of claim 2, further comprising:

a scanner connected to the shopping basket reading the code when the article is placed in the shopping basket and determining whether the code is read correctly, and;

wherein the mark writer changes the "valid" mark to the "invalid" mark when the scanner determines that the code is not read correctly.

4. The system of claim 3, further comprising:

an alarm for alerting a shopper when the code is not read correctly.

5. The system of claim 3, wherein the code is indicative of a price of the article.

6. The system of claim 3, wherein the mark writer includes a transmitter for transmitting signals to the article to change the "valid" mark to an "invalid" mark on the article.

7. The system of claim 6, further comprising a means for summing a plurality of codes indicative of prices for a plurality of articles.

8. A shopping basket including an article accounting system, comprising:

a shopping basket capable of holding articles;

a means, attached to the shopping basket, for reading a code on an article as it is placed in the shopping basket and detecting whether the code is read correctly; and a means, attached to the shopping basket, for writing an "invalid" mark onto a portion of the article when the code on the article is not read correctly.

9. The shopping basket of claim 8, wherein the code is indicative of the price of the article.

10. The shopping basket of claim 9, further comprising a means for summing a plurality of codes indicative of prices for a plurality of articles.

11. The shopping basket of claim 8, wherein the means for writing includes a means for transmitting signals to the article to change the "valid" mark to an "invalid" mark on the article.

* * * * *